United States Patent
Yabuno et al.

(10) Patent No.: US 7,317,408 B2
(45) Date of Patent: Jan. 8, 2008

(54) DIGITAL MODULATION APPARATUS AND DIGITAL MODULATION METHOD

(75) Inventors: Hiroyuki Yabuno, Osaka (JP); Hironori Deguchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 72 days.

(21) Appl. No.: 10/553,215

(22) PCT Filed: Mar. 18, 2004

(86) PCT No.: PCT/JP2004/003694

§ 371 (c)(1),
(2), (4) Date: Jun. 26, 2006

(87) PCT Pub. No.: WO2004/102565

PCT Pub. Date: Nov. 25, 2004

(65) Prior Publication Data

US 2007/0080833 A1    Apr. 12, 2007

(30) Foreign Application Priority Data

May 13, 2003   (JP) ............................. 2003-134638

(51) Int. Cl.
*H03M 5/00* (2006.01)
(52) U.S. Cl. ........................... 341/58; 341/59; 341/68; 341/69; 360/41; 369/59.23
(58) Field of Classification Search .................. 341/58, 341/59
See application file for complete search history.

(56) References Cited

U.S. PATENT DOCUMENTS

| | | | | |
|---|---|---|---|---|
| 5,151,699 | A  * | 9/1992 | Moriyama | 341/58 |
| 6,297,753 | B1 * | 10/2001 | Hayami | 341/59 |
| 6,696,994 | B2 * | 2/2004 | Suh et al. | 341/68 |
| 7,009,532 | B2 * | 3/2006 | Ushiyama et al. | 341/59 |
| 7,212,483 | B2 * | 5/2007 | Kobari et al. | 369/59.23 |
| 7,215,261 | B2 * | 5/2007 | Ushiyama et al. | 341/59 |

FOREIGN PATENT DOCUMENTS

| | | |
|---|---|---|
| JP | 1-319178 | 12/1989 |
| JP | 9-162744 | 6/1997 |
| JP | 9-246980 | 9/1997 |
| JP | 10-144007 | 5/1998 |
| JP | 2000-134101 A | 5/2000 |
| JP | 2003-168217 A | 6/2003 |

* cited by examiner

*Primary Examiner*—Khai M. Nguyen
(74) *Attorney, Agent, or Firm*—McDermott Will & Emery LLP

(57) ABSTRACT

A digital modulation apparatus capable of generating a modulated code so that binary slice is correctly performed when reproducing is provided. To achieve this, in a digital modulation apparatus (10A), a DSV change amount calculator (15) calculates change amounts (ΔDSVa, ΔDSVb) in DSVs of candidate modulated codes (CODEa, CODEb) generated by a modulated code generator (11). A modulated code determinator (13) compares the change amounts (ΔDSVa, ΔDSVb), and determines that the candidate modulated code having a smaller absolute value should be selected as a modulated code (CODE). A modulated code selector (14) selects one of the candidate modulated codes (CODEa, CODEb) which is determined by the modulated code determinator (13), and outputs the selected code as a modulated code (CODE) for source data (DATA).

23 Claims, 19 Drawing Sheets

DIGITAL MODULATION APPARATUS AND DIGITAL MODULATION METHOD

RELATED APPLICATION

This application is a national phase of PCT/JP2004/003694 filed on Mar. 18, 2004, which claims priority from Japanese Application No. 2003-134638 filed on May 13, 2003, the disclosures of which Applications are incorporated by reference herein. The benefit of the filing and priority dates of the International and Japanese Applications is respectfully requested.

TECHNICAL FIELD

The present invention relates to a digital modulation technique, and more particularly, to a digital modulation technique appropriate for an information recording apparatus which converts source data to a modulated code having a limited run length to perform a data write operation with respect to a recording medium, a communication apparatus (particularly, a transmission apparatus) using the modulated code as a signal transmitted through a transmission channel, and the like.

BACKGROUND ART

In digital modulation which requires suppression of a DC component, such as RLL (Run Length Limited) or the like, when recording data onto a recording medium, the DC component of a signal needs to be suppressed so that a modulated signal can be stably reproduced. FIG. 17 illustrates a structure of a conventional digital modulation apparatus which is used as an optical disc apparatus capable of signal recording and the like, particularly a communication apparatus of performing optical communication. The conventional digital modulation apparatus 10 comprises a modulated code generator 11 of receiving source data DATA and generating modulated codes CODEa and CODEb, two DSV calculators 12 of receiving the modulated codes CODEa and CODEb and calculating DSVa and DSVb, respectively, a modulated code determinator 13 of comparing sizes of DSVa and DSVb to determine a modulated code to be selected, and a modulated code selector 14 of selecting one of the codes CODEa and CODEb based on a result of determination by the modulated code determinator 13 and outputting the selected code as a modulated code CODE. In this manner, the conventional digital modulation apparatus 10 selects an optimal modulated code from a plurality of modulated codes using a DSV (Digital Sum Value) of a binary signal as a measure so that the DSV consistently has a minimum absolute value.

The DSV is a measure which has been introduced so as to take a balance of the amounts of "0" and "1" in an NRZI (Non Return to Zero Invert) format modulated signal to be transmitted through a transmission channel, and is obtained by accumulating "−1" or "+1" if each channel bit constituting the NRZI format modulated signal is "0" or "1", respectively. In other words, if the DSV is "0", the channel bits constituting the NRZI format modulated signal from a modulation starting point to a current time include the same number of "0"s and "1"s. Therefore, by performing a code selection control (also referred to as a DC control) so that the DSV value approaches "0", the DC component of the modulated signal can be suppressed to a small value (see, for example, Patent Publication 1).

A method of generating a modulated data sequence while inserting a binding bit between each code has been proposed (see, for example, Non-patent Publication 1). Also in this case, if the modulated code is considered to be composed of a code portion (14 bits) and a binding bit portion (3 bits), this method can be said to be of the above-described digital modulation scheme using the DC control method using a DSV as a measure.

(Patent Publication 1) JP H09-162744 A (pages 5 to 9, FIGS. 1 and 2)

(Non-patent Publication 1) Heitaro Nakajima and Hiroshi Ogawa, "Zukai Konpakutodhishuku Dokuhon (Illustrated Compact Disc)", revised 2nd version, Ohmsha, December 1993, pp. 125-131

DISCLOSURE OF THE INVENTION

Problems to be Solved by the Invention

A signal digitally modulated by the digital modulation apparatus 10 is reproduced as follows. FIG. 18 illustrates a structure of a demodulation section of a signal reproducing apparatus which reproduces a digitally modulated signal, such as a CD player, a DVD player, or the like. Initially, a channel signal CODE which has been transmitted through a transmission channel is passed through a low-pass filter 21 to extract a DC component DCref of the channel signal CODE. Here, the channel signal CODE is a modulated code CODE generated by the digital modulation apparatus 10. Next, a binarizer 22 performs binary slice using the DC component DCref of the channel signal CODE itself as a threshold (also referred to as a slice level) to output NRZI format modulated binary data DT0. Thereafter, the modulated binary data DT0 is demodulated by a modulator 23 to reproduce data DT1 which is original source data.

In the signal reproducing apparatus which has the demodulation portion having the above-described structure, it is important that a binary slice level be appropriately held so as to achieve demodulation as correctly as possible. Therefore, it is necessary that the DC component of the channel signal CODE be stably extracted. However, in the case of a conventional method which performs a code selection control which causes a DSV value to unconditionally approach "0", it is likely that the DC component of the channel signal CODE cannot be stably extracted under a certain particular condition. An example of the particular condition includes the case where, when the DC component is not sufficiently suppressed, because, for example, DC control has not been sufficiently performed due to an input pattern of a source code, the DC control is started (again).

Under the above-described particular condition, the conventional digital modulation apparatus selects modulated codes which are all consistently positive or negative so that a DSV approaches "0" for each DC-controllable modulated code. As a result, the balance of "0"s and "1"s of the NRZI format modulated signal is locally lost as illustrated in FIG. 19. In this case, the DC component of the modulated signal fluctuates during signal modulation, so that it is likely that binary slice cannot be correctly performed. If binary slice is not correctly performed, signal reproduction jitter increases during reproduction, likely leading to a reproduction error.

The present invention is provided to solve the above-described problems. An object of the present invention is to provide a digital modulation apparatus and method of receiving and converting source data to an NRZI format modulated code having a limited run length, in which a modulated code for which binary slice is correctly performed during reproduction is generated.

Means to Solve the Problems

To solve the above-described problems, the present invention provides a digital modulation apparatus for converting input source data to an NRZI format modulated code having a limited run length, comprising modulated code generating means of generating a plurality of candidate modulated codes with respect to the source data, the plurality of candidate modulated codes being candidates for the modulated code, DSV change calculating means of calculating a degree of a change in a DSV of a modulated code sequence when each of the plurality of candidate modulated codes generated by the code generating means is selected as the modulated code, modulated code determining means of comparing the degrees of changes in the DSVs calculated by the DSV change calculating means with each other, and determining that one of the plurality of candidate modulated codes generated by the modulated code generating means, the one causing the degree of a change in the DSV to be relatively small, should be used as the modulated code, and modulated code selecting means of selecting one of the plurality of candidate modulated codes generated by the code generating means, the one corresponding to a result of determination by the code determining means, and outputting the selected candidate modulated code as the modulated code.

Thereby, one of modulated codes (candidate modulated codes) generated with respect to source code, the one causing the degree of a change in DSV to be relatively small, is output. Thus, a DC control is performed so that the degree of a change in DSV is reduced, thereby eliminating a one-sided change (increase or decrease) in the DSV of a sequence of a generated modulated code, resulting in a modulated code having a balance between "0"s and "1"s. In other words, it is possible to stably extract a DC component and generate a modulated code which allows correct binary slice.

Preferably, the degree of a change in the DSV is calculated within a range corresponding to a code sequence including a predetermined number of nearest candidate modulated codes generated by the modulated code generating means, and the predetermined number is determined, depending on characteristics of a signal reproducing apparatus for reproducing the modulated code.

Preferably, the degree of a change in the DSV is calculated within a range corresponding to a code sequence including a predetermined number of nearest candidate modulated codes generated by the modulated code generating means, and the predetermined number is determined, depending on characteristics of a low-pass filter circuit for determining a binary slice level in a signal reproducing apparatus for reproducing the modulated code.

Specifically, the DSV change calculating means includes CDS holding means of holding a CDS corresponding to a DSV of each code in a code sequence including a predetermined number of candidate modulated codes generated by the modulated code generating means, and CDS accumulating means of accumulating the CDS of each code in the code sequence and holding the accumulated value. The DSV change calculating means outputs the CDS accumulated value held in the CDS accumulating means as the degree of a change in the DSV.

More specifically, the CDS holding means, when a code is input to the DSV change calculating means, holds a first CDS of the input code and outputs a second CDS of an oldest code of the held CDSs, and the CDS accumulating means adds the first CDS to and subtracts the second CDS from the CDS accumulated value held therein and holds the resultant value as a new CDS accumulated value.

Also, the digital modulation apparatus comprises DSV calculating means of calculating a DSV of a modulated code sequence when each of the plurality of candidate modulated codes generated by the modulated code generating means is selected as the modulated code. Preferably, the modulated code determining means, when all the degrees of changes in the DSVs exceed a predetermined threshold, performs the determination, and when at least one of the degrees of changes in the DSVs is smaller than or equal to the predetermined threshold, compares DSVs whose degree of a change is smaller than or equal to the predetermined threshold, among the DSVs calculated by the DSV calculating means, with each other, to determine that one of the plurality of candidate modulated codes generated by the modulated code generating means, the DSV of the one being closer to a predetermined value.

Thereby, in the process of generating a modulated code, it is possible to converge a DSV to a predetermined value while suppressing the degree of a change in the DSV within a predetermined threshold. As a result, it is possible to cause the DSV to approach a preferable value while suppressing a sudden change in the DSV.

Further, the present invention provides a digital modulation apparatus for converting input source data to an NRZI format modulated code having a limited run length, comprising modulated code generating means of generating a plurality of candidate modulated codes with respect to the source data, the plurality of candidate modulated codes being candidates for the modulated code, DSV calculating means of calculating a DSV of a modulated code sequence when each of the plurality of candidate modulated codes generated by the modulated code generating means is selected as the modulated code, DSV resetting means of initializing the DSV calculated by the DSV calculating means, modulated code determining means of comparing the DSVs calculated by the DSV calculating means with each other, and determining that one of the plurality of candidate modulated codes generated by the modulated code generating means, the one causing the DSV to be relatively small, should be used as the modulated code, and modulated code selecting means of selecting one of the plurality of candidate modulated codes generated by the modulated code generating means, the one corresponding to a result of determination by the code determining means, and outputting the selected candidate modulated code as the modulated code.

Thereby, the DSV calculated by the DSV calculating means is initialized as appropriate, so that the DSV can be prevented from being an excessively large positive or negative value in the process of generating a modulated code. As a result, it is possible to suppress a sudden change in the DSV.

Preferably, the DSV resetting means performs the initialization when any of the DSVs calculated by the DSV calculating means is larger than or equal to a predetermined threshold, and/or in predetermined cycles.

Further, the present invention provides a digital modulation apparatus for converting input source data to an NRZI format modulated code having a limited run length, in which a value corresponding to a logic level of each bit in a sequence of the modulated code is weighted, depending on a run length, and is accumulated, the resultant value is used as a measure indicating a DC component included in the sequence of the modulated code, and the modulated code is selected so that the measure approaches a predetermined value.

Thus, a value corresponding to a logic level of each bit in a sequence of the modulated code is weighted, depending on a run length, and is accumulated, the resultant value is used as a measure indicating a DC component included in the sequence of the modulated code, instead of a DSV. Thereby, it is possible to more accurately approximate an analog signal waveform of an actual modulated code. Therefore, it is possible to achieve a more accurate DC control than conventional DC controls using DSV as a measure, resulting in an improvement in stability when reproducing a modulated code.

Preferably, the weighting depending on the run length is performed so that, when a first run length is larger than a second run length, a weight corresponding to the first run length is larger than or equal to a weight corresponding to the second run length. Specifically, the weights corresponding to the first and second run lengths are determined based on accumulated values corresponding to the first and second run lengths in an analog signal waveform corresponding to the sequence of the modulated code.

Further, the present invention provides a digital modulation method for converting input source data to an NRZI format modulated code having a limited run length, comprising a modulated code generating step of generating a plurality of candidate modulated codes with respect to the source data, the plurality of candidate modulated codes being candidates for the modulated code, a DSV change calculating step of calculating a degree of a change in a DSV of a modulated code sequence when each of the plurality of candidate modulated codes generated by the code generating step is selected as the modulated code, and a modulated code outputting step of comparing the degrees of changes in the DSVs calculated by the DSV change calculating step with each other, and outputting, as the modulated code, one of the plurality of candidate modulated codes generated by the modulated code generating step, the one causing the degree of a change in the DSV to be relatively small.

Thereby, a DC control is performed so that the degree of a change in DSV is reduced, resulting in a modulated code having a balance between "0"s and "1"s. In other words, it is possible to stably extract a DC component and generate a modulated code which allows correct binary slice.

Preferably, the digital modulation method comprises a DSV calculating step of calculating a DSV of a modulated code sequence when each of the plurality of candidate modulated codes generated by the modulated code generating step is selected as the modulated code. The modulated code outputting step, when all the degrees of changes in the DSVs exceed a predetermined threshold, performs the outputting, and when at least one of the degrees of changes in the DSVs is smaller than or equal to the predetermined threshold, compares DSVs whose degree of a change is smaller than or equal to the predetermined threshold, among the DSVs calculated by the DSV calculating step, with each other, to determine that one of the plurality of candidate modulated codes generated by the modulated code generating step, the DSV of the one being closer to a predetermined value.

Further, the present invention provides a digital modulation method for converting input source data to an NRZI format modulated code having a limited run length, comprising a modulated code generating step of generating a plurality of candidate modulated codes with respect to the source data, the plurality of candidate modulated codes being candidates for the modulated code, a DSV calculating step of calculating a DSV of a modulated code sequence when each of the plurality of candidate modulated codes generated by the code generating step is selected as the modulated code, a DSV resetting step of initializing the DSV calculated by the DSV calculating step, and a code outputting step of comparing the DSVs calculated by the DSV calculating step with each other, and outputting, as the modulated code, one of the plurality of candidate modulated codes generated by the modulated code generating step, the one causing the DSV to be relatively small.

Thereby, the DSV calculated by the DSV calculating step is initialized as appropriate, so that the DSV can be prevented from being an excessively large positive or negative value in the process of generating a modulated code. As a result, it is possible to suppress a sudden change in the DSV.

Further, the present invention provides a digital modulation method for converting input source data to an NRZI format modulated code having a limited run length, in which a value corresponding to a logic level of each bit in a sequence of the modulated code is weighted, depending on a run length, and is accumulated, the resultant value is used as a measure indicating a DC component included in the sequence of the modulated code, and the modulated code is selected so that the measure approaches a predetermined value.

Thus, a value corresponding to a logic level of each bit in a sequence of the modulated code is weighted, depending on a run length, and is accumulated, the resultant value is used as a measure indicating a DC component included in the sequence of the modulated code, instead of a DSV. Thereby, it is possible to more accurately approximate an analog signal waveform of an actual modulated code. Therefore, it is possible to achieve a more accurate DC control than conventional DC controls using DSV as a measure, resulting in an improvement in stability when reproducing a modulated code.

Effects of the Invention

As described above, according to the present invention, it is possible to achieve a digital modulation apparatus and a digital modulation method which generates a modulated code which allows accurate binary slice when reproducing, from given source code. Thereby, it is possible to reduce jitter of a reproduced signal when reproducing a signal to improve reproduction accuracy in a signal reproducing apparatus, a communication apparatus, and the like which demodulate and reproduce a modulated code generated by the digital modulation apparatus and the digital modulation method of the present invention.

BRIEF DESCRIPTION OF THE INVENTION

BEST MODE FOR CARRYING OUT THE INVENTION

Figure 1:
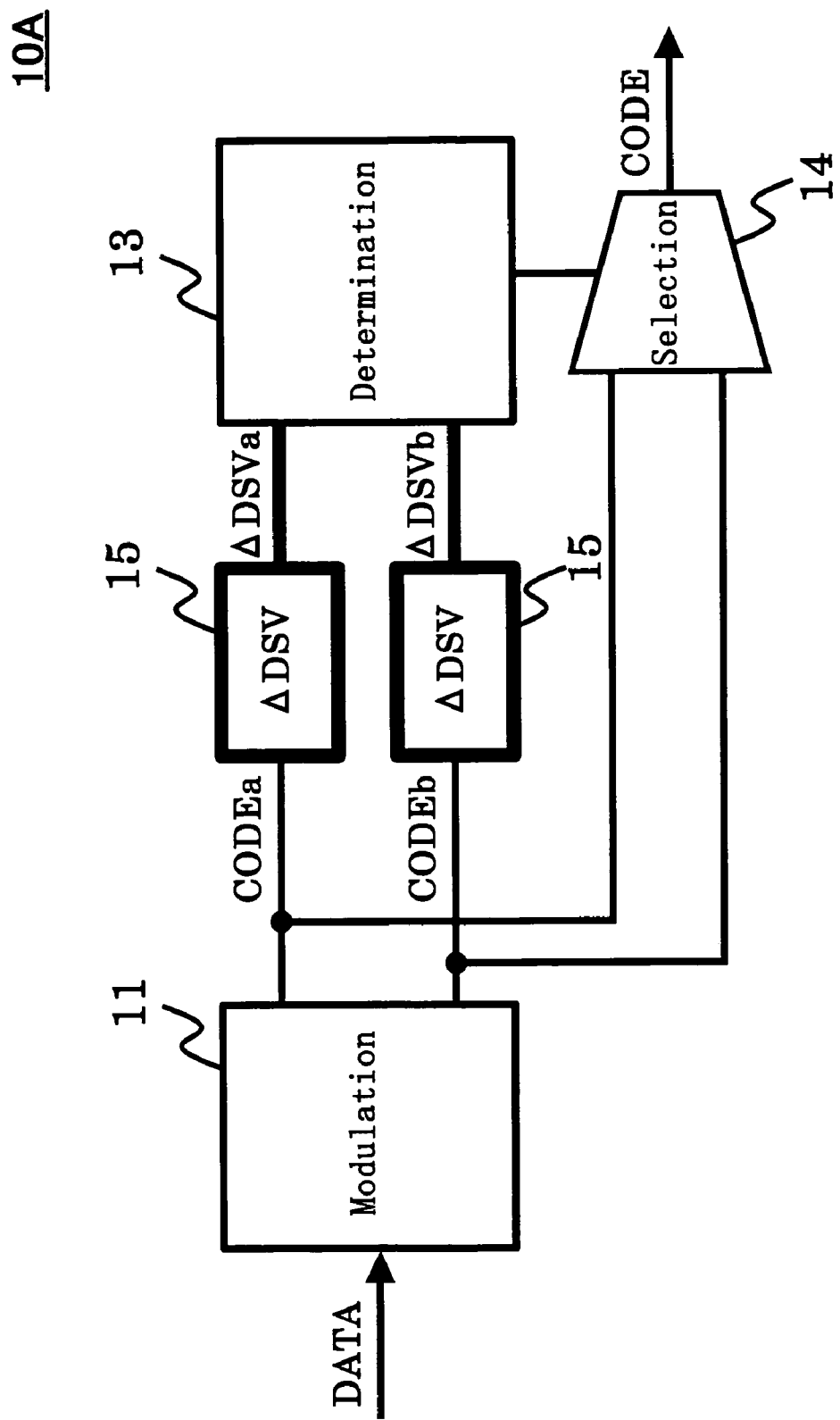
FIG. 1 is a diagram illustrating a structure of a digital modulation apparatus according to a first embodiment of the present invention.

Hereinafter, embodiments of the present invention will be described with reference to the accompanying drawings. Note that major reference numerals in the drawings are described as follows.

10A, 10B, 10C, 10D digital modulation apparatus
11 modulated code generator
12 DSV calculator
13, 16 modulated code determinator
14 modulated code selector
15 DSV change amount calculator
17 reset determinator
18 DC component evaluation measure calculator
151, 155 register
152 shift register
153 subtractor
154 adder
DATA source data
CODEa, CODEb candidate modulated code
ΔDSVa, ΔDSVb DSV change amount
DSVa, DSVb DSV
DCa, DCb DC component evaluation measure
CODE modulated code First Embodiment FIG. 1 illustrates a structure of a digital modulation apparatus according to a first embodiment of the present invention. The digital modulation apparatus 10A of the first embodiment comprises a modulated code generator 11 as modulated code generating means, a modulated code determinator 13 as modulated code determining means, a modulated code selector 14 as modulated code selecting means, and two DSV change amount calculators 15 as DSV change calculating means. The digital modulation apparatus 10A receives source data DATA and outputs an NRZI format modulated code CODE having a limited run length.

The modulated code generator 11 receives source data DATA and generates candidate modulated codes CODEa and CODEb which are candidates for the modulated code CODE to be output by the digital modulation apparatus 10A. Note that, for a certain particular source data input pattern, there may be only a single corresponding modulated code. In such a case, the signal modulated code is assumed to be used as both the candidate modulated codes CODEa and CODEb.

Figure 2:
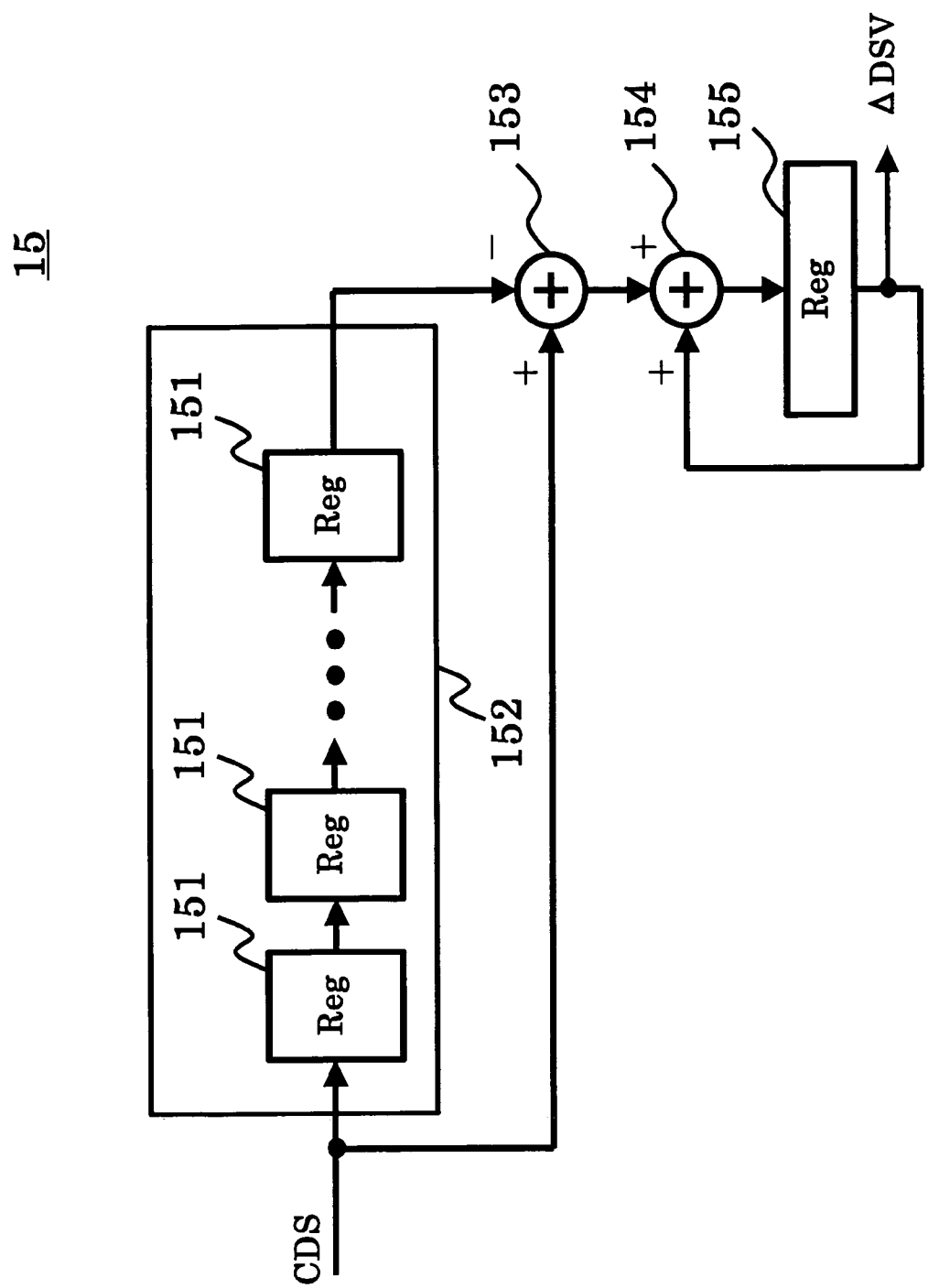
FIG. 2 is a diagram illustrating an internal structure of a DSV change amount calculator.

The DSV change amount calculator 15 receives the candidate modulated codes CODEa and CODEb generated by the modulated code generator 11 and outputs change amounts ΔDSVa and ΔDSVb as the degrees of a change in DSV of a modulated code sequence. FIG. 2 illustrates an internal structure of the DSV change amount calculator 15. The DSV change amount calculator 15 comprises a shift register 152 including n (n is a natural number of 2 or more) registers 151 as CDS (Code Digital Sum) holding means, and a subtractor 153, an adder 154, and a register 155 as CDS accumulating means. Note that CDS refers to a value indicating a DSV of a single NRZI format modulated code.

The DSV change amount calculator 15 is operated as follows. Initially, every time a CDS is input to the DSV change amount calculator 15, the CDS is input (shift-in) to the shift register 152, and is input to a non-inverting (positive) terminal of the subtractor 153. An output (shift-out) of the shift register 152 is input to an inverting (negative) terminal of the subtractor 153. The CDS is of the candidate modulated code CODEa or CODEb output from the modulated code generator 11. The subtractor 153 calculates "a current CDS–a CDS n modulated codes before" and outputs a result of calculation to one of two input terminals of the adder 154. To the other input terminal of the adder 154, an output of the register 155 holding an output of the adder 154 is input. Therefore, the adder 154 and the register 155 accumulate "a current CDS–a CDS n modulated codes before". Thereafter, the resultant accumulated value is output as ΔDSV.

At an operation starting point of the DSV change amount calculator 15, all values held in the registers 151 are reset to "0". After start of input of CDSs, the shift register 152 outputs "0" with respect to inputs of first to n-th CDSs. As a result, the register 155 stores a sum of the "first to n-th CDSs". Thereafter, when an (n+1)-th CDS is input, the shift register 152 outputs the first CDS, and the subtractor 153 calculates "the (n+1)-th CDS–the first CDS". Thereafter, the adder 154 and the register 155 add a result of calculation by the subtractor 153 to the previous CDS accumulated value. In other words, "the first to n-th CDS accumulated values+ the (n+1)-th CDS–the first CDS" is calculated, and a value to be stored in the register 155 is "the second to (n+1)-th CDS accumulated values". The above-described calculation is similarly performed with respect to an (n+2)-th CDS and thereafter. As described above, the DSV change amount calculator 15 outputs a change amount of DSV of latest n modulated code sequences including a given current modulated code.

Referring back to FIG. 1, the modulated code determinator 13 compares sizes of the change amounts ΔDSVa and ΔDSVb output from the DSV change amount calculator 15 to determine which of the candidate modulated codes CODEa and CODEb should be used as the modulated code CODE. By this size comparison, the degrees of changes in DSV are compared, and therefore, the DSV change amounts need to be converted to positive values before the comparison. Conversion to positive values can be performed using, for example, absolute values, square values, and the like. Note that, in the first example, absolute values are used. The modulated code determinator 13 determines as a result of the above-described size comparison that, of the candidate modulated codes CODEa and CODEb, one which causes a DSV change amount to be relatively small should be used as the modulated code CODE.

The modulated code selector 14 selects one of the candidate modulated codes CODEa and CODEb which is determined by the modulated code determinator 13, and outputs the selected one as the modulated code CODE.

Figure 3:
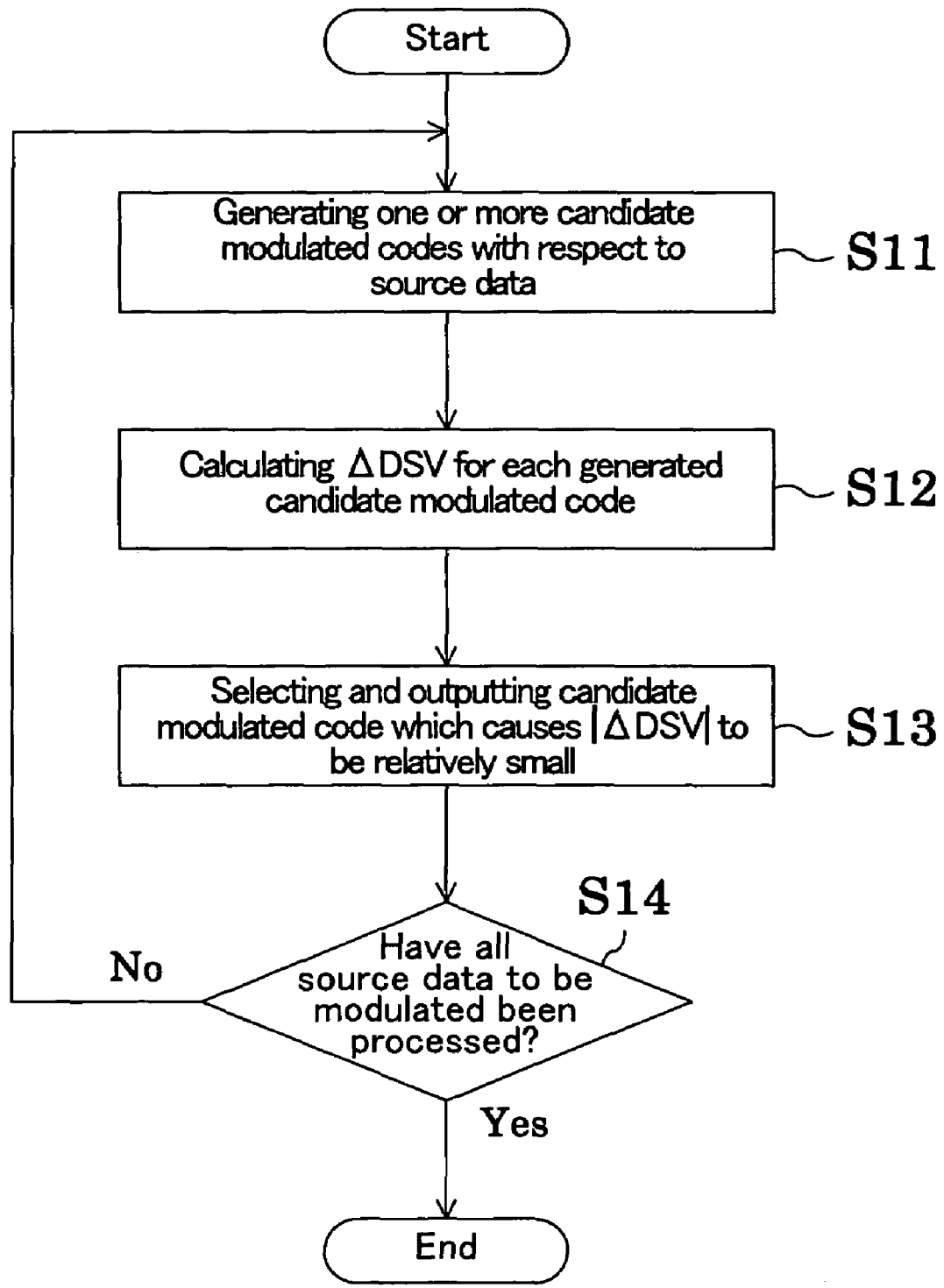
FIG. 3 is a flowchart illustrating a digital modulation process according to the first embodiment of the present invention.

Next, a digital modulation process according to the first embodiment of the present invention will be described with reference to a flowchart illustrated in FIG. 3.

Initially, when the digital modulation process is started, one or more candidate modulated codes corresponding to source data are generated (step S11). Here, a reason why the number of candidate modulated codes is assumed to be one or more is that there may be only one modulated code corresponding to a certain particular source data input pattern as described above. Step S11 corresponds to the process performed by the modulated code generator 11.

Next, for each candidate modulated code generated in step S11, a change amount (ΔDSV) of a modulated code sequence is calculated (step S12). Step S12 corresponds to the process performed by the DSV change amount calculator 15.

Thereafter, by comparing ΔDSVs calculated in step S12, one of the candidate modulated codes generated in step S11 which causes an absolute value (or square value) of the change amount (ΔDSV) to be relatively small, is selected and output (step S13). Step S13 corresponds to the process performed by the modulated code determinator 13 and the modulated code selector 14.

Thereafter, it is determined whether or not all source data to be modulated have been processed (step S14). When there is still remaining source data to be modulated, the process returns to step S11 and the next source data is processed. On the other hand, when all source data have been processed, the digital modulation process is ended.

Figure 4:
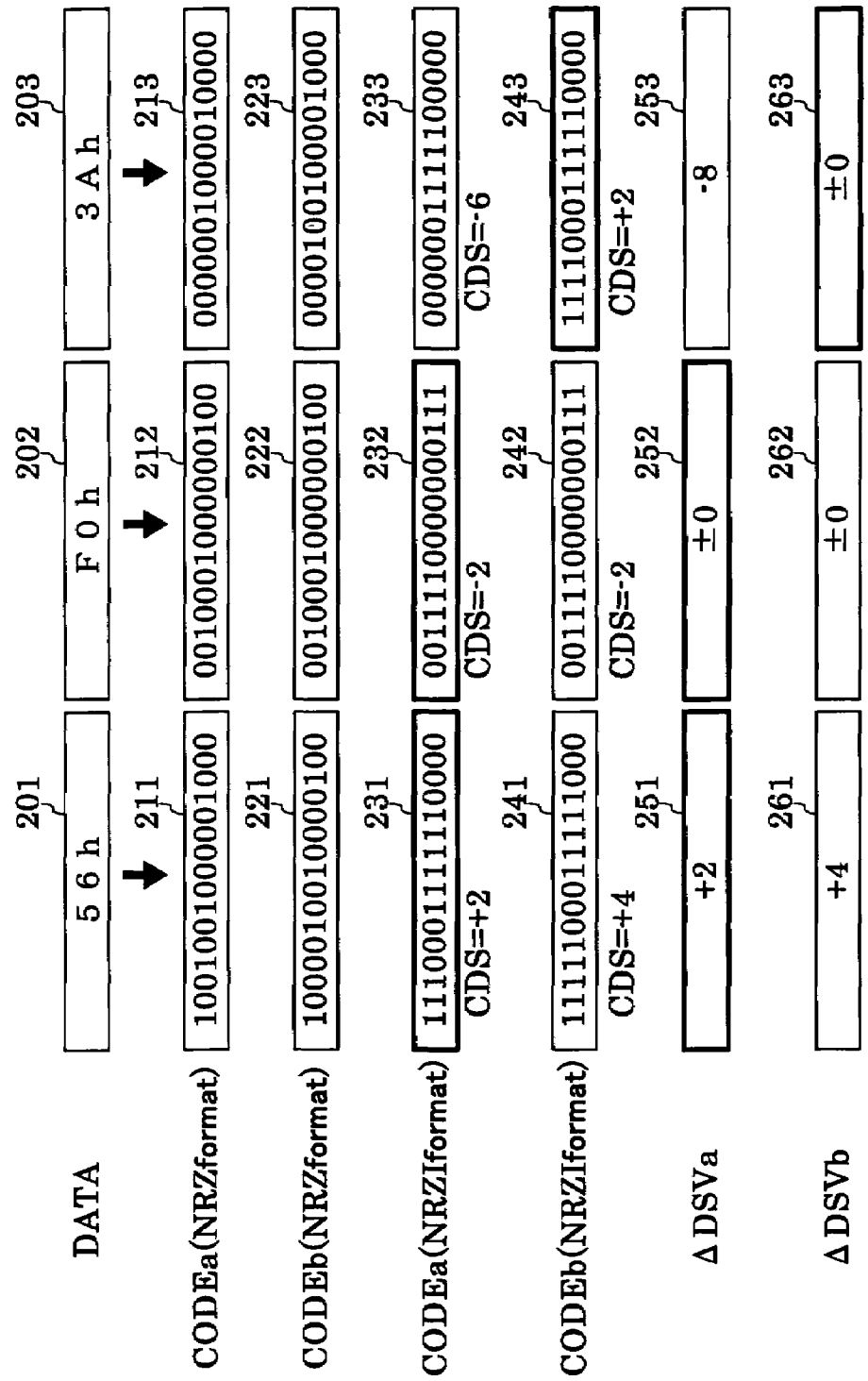
FIG. 4 is a diagram illustrating a specific example of the digital modulation process of the first embodiment of the present invention.

Next, the digital modulation process of the first embodiment will be described with reference to a specific example of FIG. 4. FIG. 4 illustrates a process of outputting modulated codes with respect to source data 201, 202, and 203 which are successively input.

For the source data 201 to 203, modulated codes 211, 212, and 213 are generated as candidate modulated codes CODEa, and modulated codes 221, 222, and 223 are generated as candidate modulated codes CODEb. Here, the modulated codes 211 to 213 and the modulated codes 221 to 223 are each of a Non Return to Zero (NRZ) format. This is because the modulated code has not yet established a Low level and a High level of the NRZI format at the time when the modulated code is output from the modulated code generator 11. Note that the candidate modulated codes CODEa and CODEb do not necessarily need to be represented using the NRZ format. For example, any one of the Low level and the High level may be selected as an NRZI format initial level, and a candidate modulated code is temporarily output, and thereafter, at the time when a correct initial level is established, if the level is inverted, all bits of the NRZI format modulated code may be inverted.

Modulated codes 231 to 233 and modulated codes 241 to 243 are obtained by converting the modulated codes 211 to 213 and the modulated codes 221 to 223, respectively, to the NRZI format. CDSs are illustrated under the respective modulated codes 231 to 233 and the modulated codes 241 to 243. As described above, ΔDSV is represented as an accumulated value of CDSs within a predetermined calculation range.

In the following description, it is assumed that the predetermined calculation range corresponds to nearest two modulated codes.

Initially, the source data 201 is input, and the CDSs of the candidate modulated code 231 (CODEa) and the candidate modulated code 241 (CODEb) are calculated to be "+2" and "+4", respectively. Here, although not shown, the CDS of source data immediately before the source data 201 is assumed to be "0". Therefore, in this case, a change amount 251 (ΔDSVa) and a change amount 261 (ΔDSVb) are calculated to be "+2" and "+4", respectively. Thereafter, the candidate modulated code 231 corresponding to the change amount 251 having a smaller absolute value is output as a modulated code corresponding to the source data 201.

Next, the source data 202 is input. Since the candidate modulated code 231 has been output immediately before, the current NRZI format initial level has been established to be Low, the candidate modulated codes 212 and 222 are NRZI-converted to candidate modulated codes 232 and 242, respectively. Note that the candidate modulated codes 212 and 222 are the same, and therefore, in this case, a plurality of modulated codes cannot be assigned by the above-described modulated code generator 11.

For the source data 202, the CDSs of the candidate modulated code 232 (CODEa) and the candidate modulated code 242 (CODEb) are each calculated to be "−2". Here, the immediately preceding CDS is the CDS of the previously selected candidate modulated code 231 and its value is "+2". Therefore, in this case, a change amount 252 (ΔDSVa) and a change amount 262 (ΔDSVb) are each calculated to be "0". In this case, any of the candidate modulated codes CODEa and CODEb may be selected. Here, the candidate modulated code CODEa is assumed to be selected. Therefore, the candidate modulated code 232 is output as a modulated code corresponding to the source data 202.

Thereafter, for the source data 203, the CDSs of the candidate modulated code 233 (CODEa) and the candidate modulated code 243 (CODEb) are calculated to be "−6" and "+2", respectively. Here, the immediately preceding CDS is the CDS of the previously selected candidate modulated code 232 and its value is "−2". Therefore, in this case, a change amount 253 (ΔDSVa) and a change amount 263 (ΔDSVb) are calculated to be "−8" and "0", respectively. Thereafter, the candidate modulated code 243 corresponding to the change amount 263 having a smaller absolute value is output as a modulated code corresponding to the source data 203.

Figure 5:
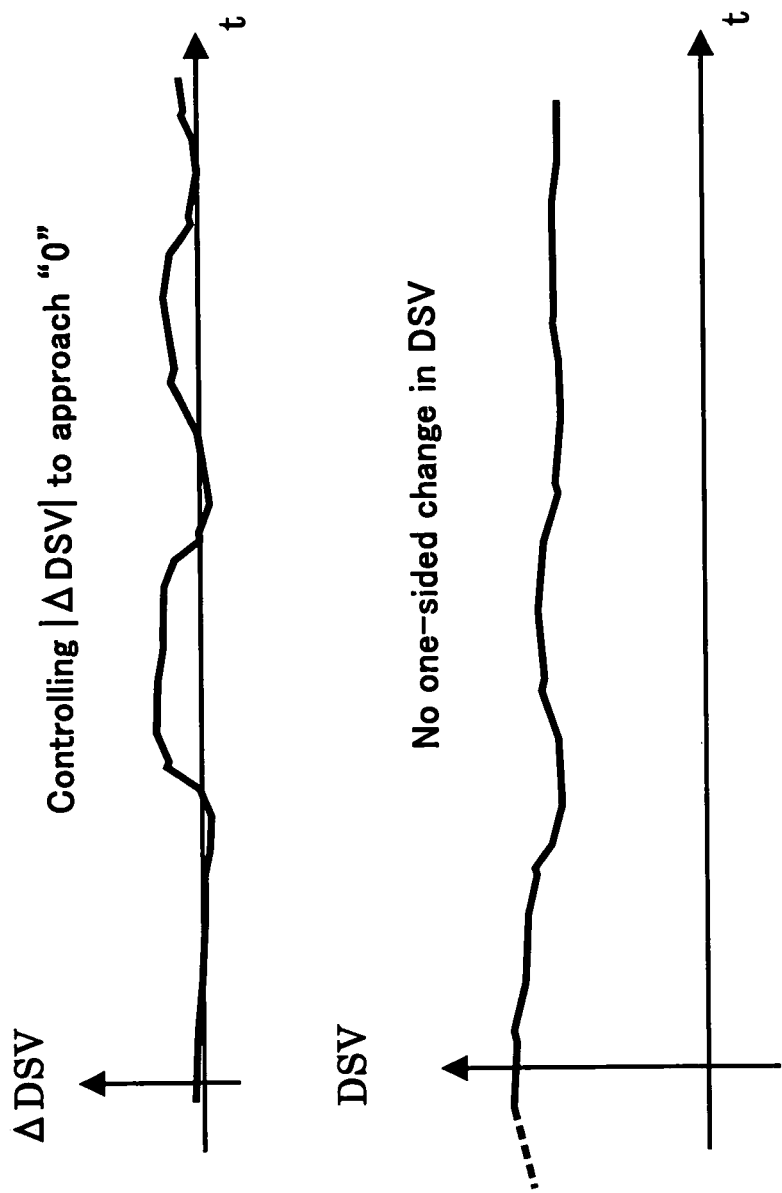
FIG. 5 is a graph illustrating changes in DSV and ΔDSV due to the digital modulation process of the first embodiment of the present invention.
Figure 18:
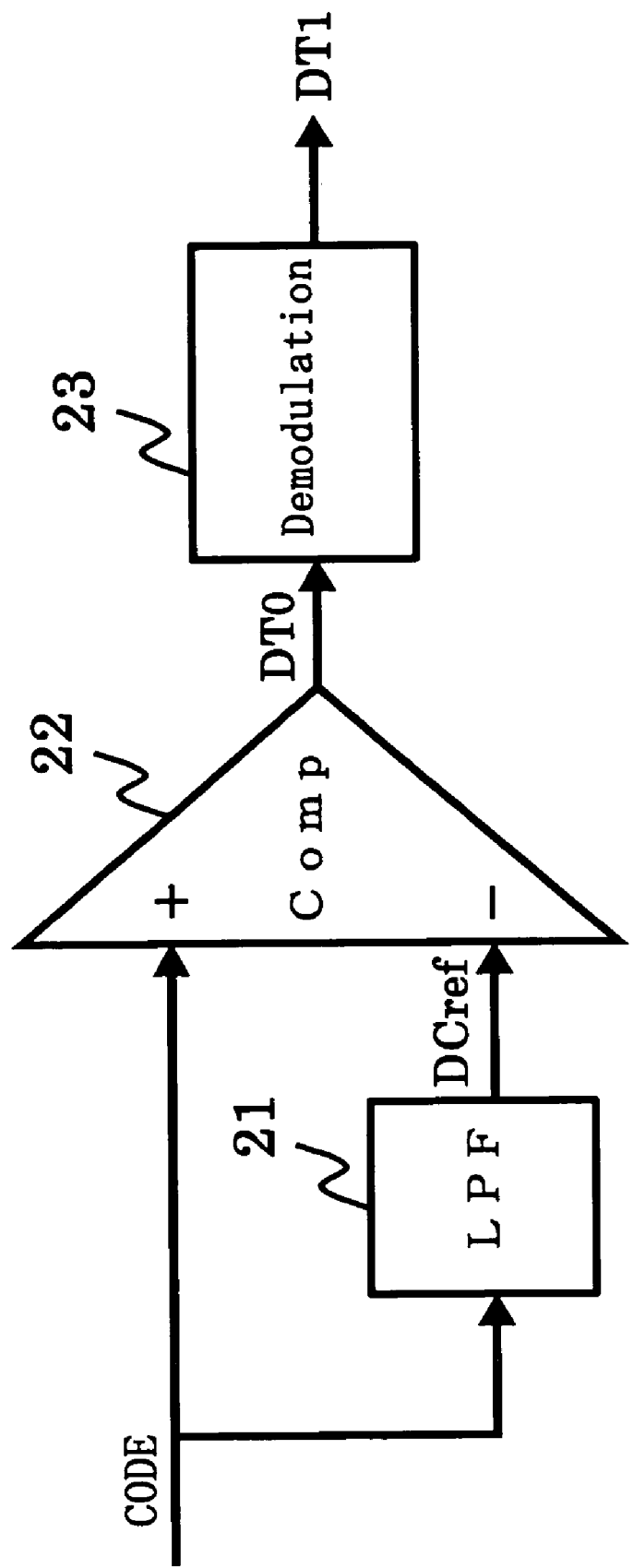
FIG. 18 is a diagram illustrating a structure of a demodulation section of a signal reproducing apparatus for reproducing a digitally modulated signal.
Figure 19:
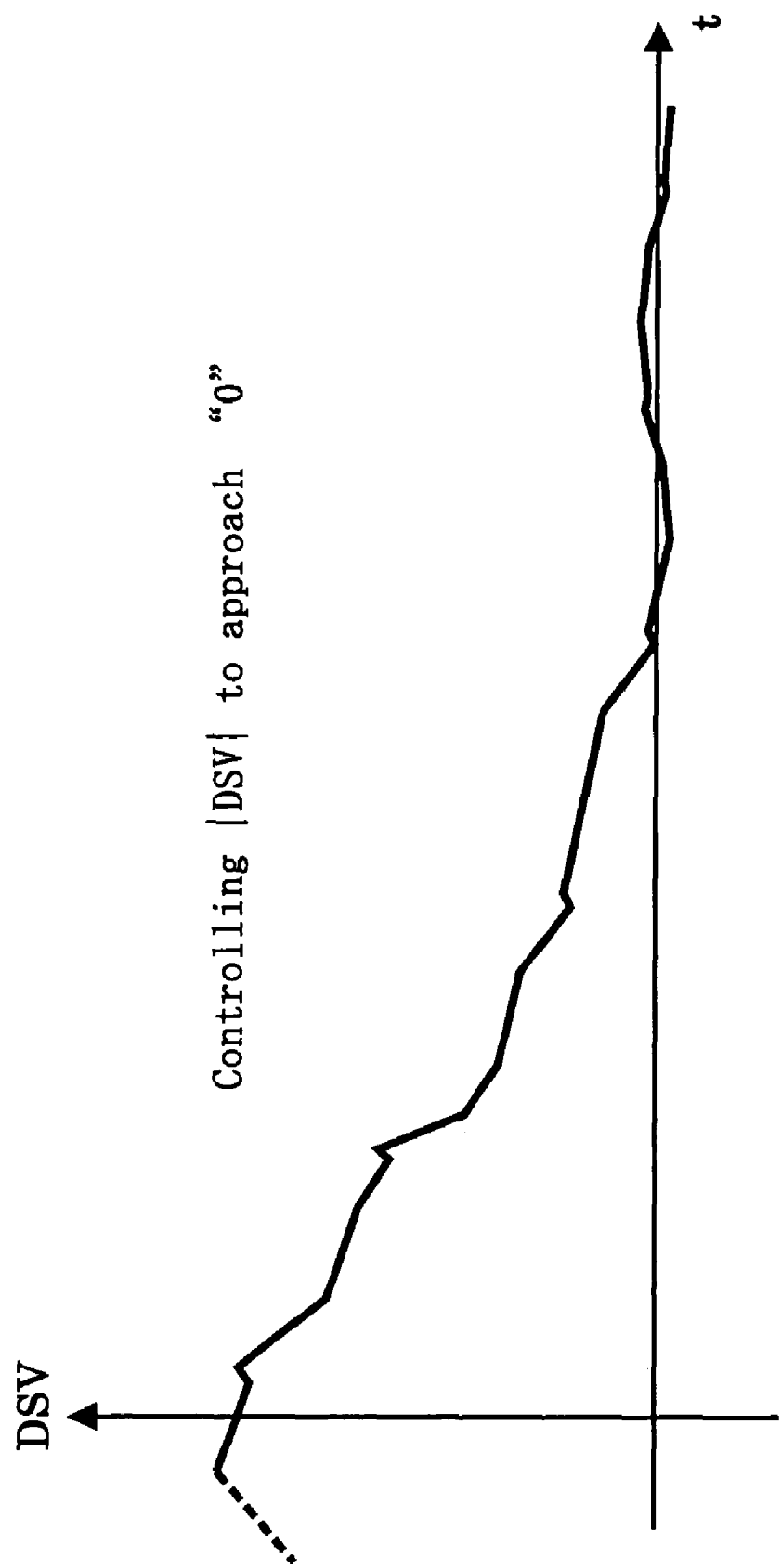
FIG. 19 is a graph illustrating a change in DSV due to a conventional digital modulation apparatus.

Thus, according to the first embodiment, a DC control is performed so that the absolute value of a change amount (ΔDSV) of DSV with respect to given source data approaches "0", thereby suppressing a sudden change in DSV, as illustrated in FIG. 5. As a result, when a generated modulated code is demodulated by, for example, the signal reproducing apparatus of FIG. 18, the DC component DCref extracted by the low-pass filter 21 is stable, whereby binary slice is correctly performed, so that reproduction accuracy can be improved.

Note, in the foregoing description, it is assumed that the calculation range for ΔDSV corresponds to nearest two modulated codes, i.e., the number of the registers 151 in the DSV change amount calculator 15, is "2". The present invention is not limited to this. The calculation range is preferably set, depending on characteristics of a signal reproducing apparatus which demodulates a generated modulated code. For example, the calculation range is set, depending on characteristics of the low-pass filter 21 in the signal reproducing apparatus of FIG. 18. Thereby, a modulated code optimal to each of various signal reproducing apparatuses can be generated.

Second Embodiment

Figure 6:
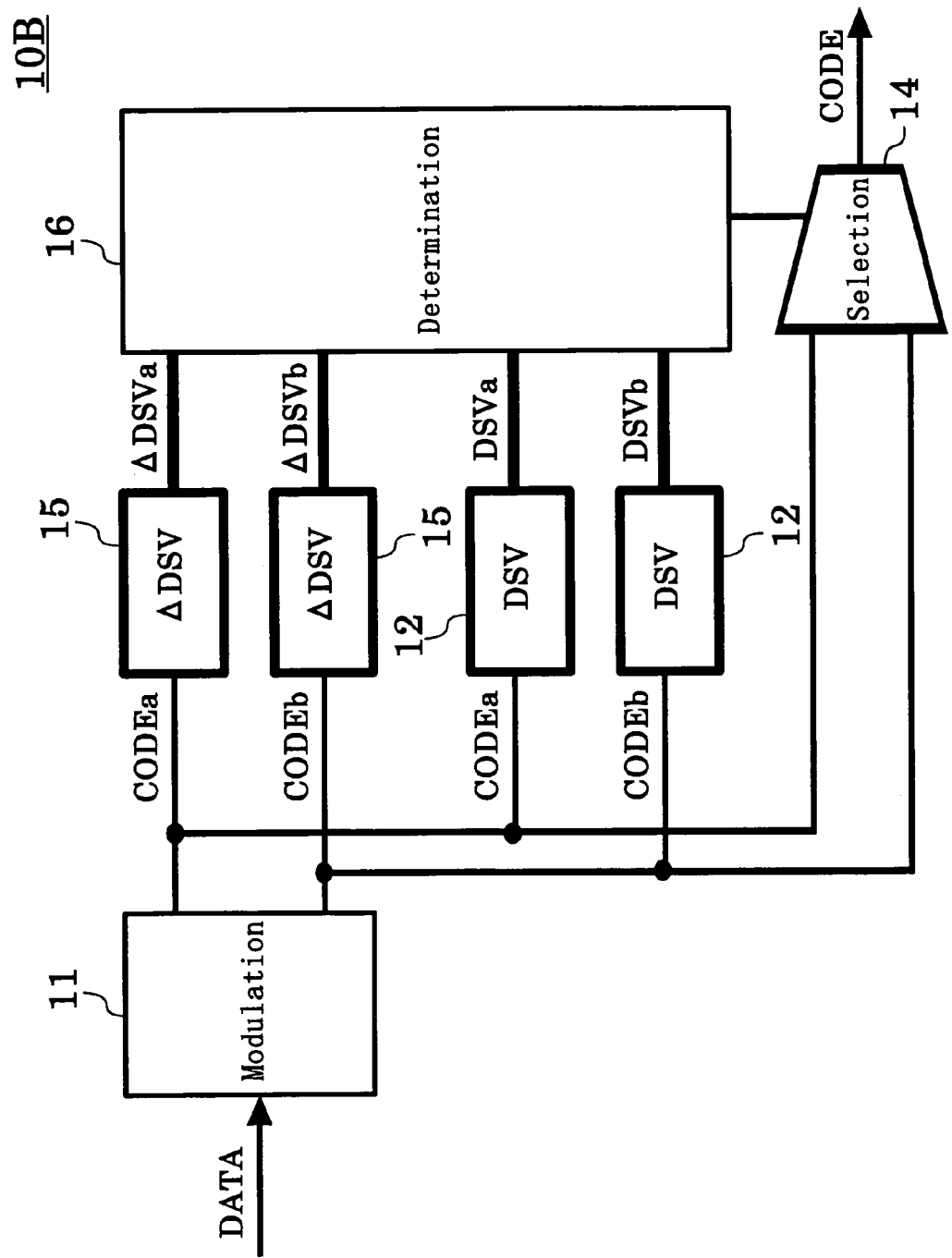
FIG. 6 is a diagram illustrating a structure of a digital modulation apparatus according to a second embodiment of the present invention.

FIG. 6 illustrates a structure of a digital modulation apparatus according to a second embodiment of the present invention. The digital modulation apparatus 10B of the second embodiment comprises a modulated code generator 11, two DSV calculators 12, a modulated code selector 14, two DSV change amount calculators 15, and a modulated code determinator 16. The digital modulation apparatus 10B receives source data DATA and outputs an NRZI format modulate d code CODE having a limited run length. The parts other than the modulated code determinator 16 are the same as those described above.

The modulated code determinator 16 receives change amounts ΔDSVa and ΔDSVb output by the respective DSV change amount calculators 15, and DSVa and DSVb output by the respective DSV calculators 12, and based on these inputs, determines which of the candidate modulated codes CODEa and CODEb should be used as a modulated code CODE. Specifically, when both the change amounts ΔDSVa and ΔDSVb exceed a predetermined threshold, the sizes thereof are compared to perform the above-described determination. The determination is similar to that described in the first embodiment. On the other hand, when at least one of the change amounts ΔDSVa and ΔDSVb is smaller than or equal to the predetermined threshold, the sizes of DSVs satisfying such a condition are compared. It is determined that a candidate modulated code corresponding to the smaller DSV (any one of CODEa and CODEb) should be used as a modulated code CODE. Specifically, when ΔDSV which is smaller than or equal to the predetermined threshold is any one of the change amounts ΔDSVa and ΔDSVb, a modulated code corresponding to the ΔDSV is selected. When both the change amounts ΔDSVa and ΔDSVb are smaller than or equal to the predetermined threshold, the sizes of DSVa and DSVb are compared, so that a modulated code is selected, depending on a result of the comparison. Note that the size comparison of DSVs is performed after the DSVs are converted to positive values, such as absolute values, square values, or the like, as in the size comparison of ΔDSVs.

Figure 7:
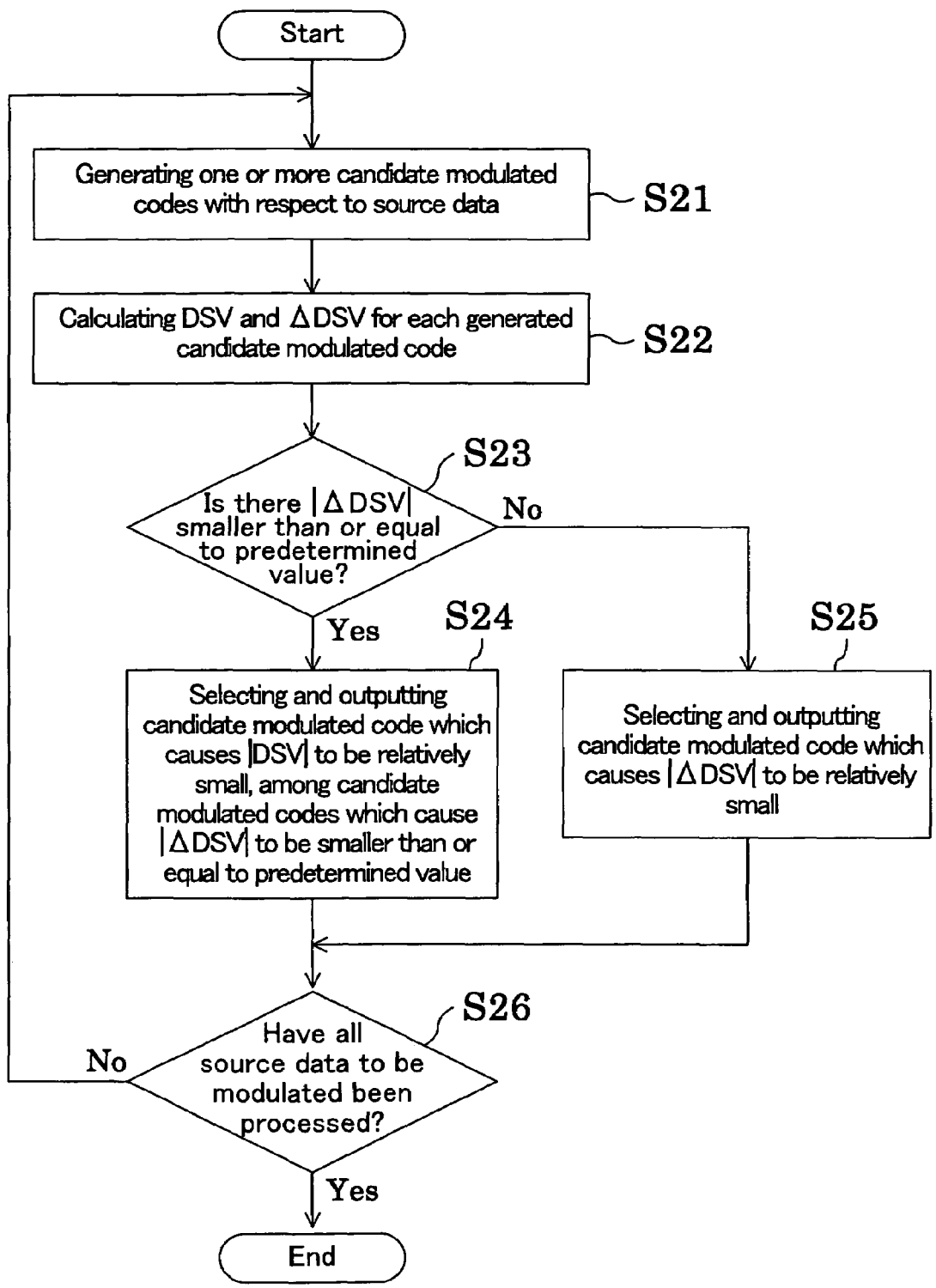
FIG. 7 is a flowchart illustrating a digital modulation process according to the second embodiment of the present invention.

Next, the digital modulation process of the second embodiment will be described with reference to a flowchart illustrated in FIG. 7.

Initially, when a digital modulation process is started, one or more candidate modulated codes corresponding to source data are generated (step S21). Step S21 corresponds to the process performed by the modulated code generator 11.

Thereafter, for each candidate modulated code generated in step S21, the DSV and ΔDSV of the modulated code sequence are calculated (step S22). Step S22 corresponds to the process performed by the DSV calculator 12 and the DSV change amount calculator 15.

Next, it is determined whether or not there are one or more of the ΔDSVs calculated in step S22 whose absolute values (or square values) are smaller than or equal to a predetermined threshold (step S23). When a result of the determination is Yes, one or more of the DSVs calculated in step S22 whose corresponding ΔDSVs are smaller than or equal to the predetermined threshold are compared with each other. One of the candidate modulated codes generated in step S21 which causes the absolute value (or square value) of the DSV to be relatively small is selected and output (step S24). When the result of the determination is No, the ΔDSVs calculated in step S22 are compared with each other. One of the candidate modulated codes calculated in step S21 which causes the absolute value (or square value) of the ΔDSV to be relatively small is selected and output (step S25). Steps S23 to S25 correspond to the process performed by the modulated code determinator 16.

Thereafter, it is determined whether or not all source data to be modulated have been processed (step S26). When there is still remaining source data to be processed, the process goes to step S21 and the next source data is processed. When all source data have been processed, the digital modulation process is ended.

Figure 8:
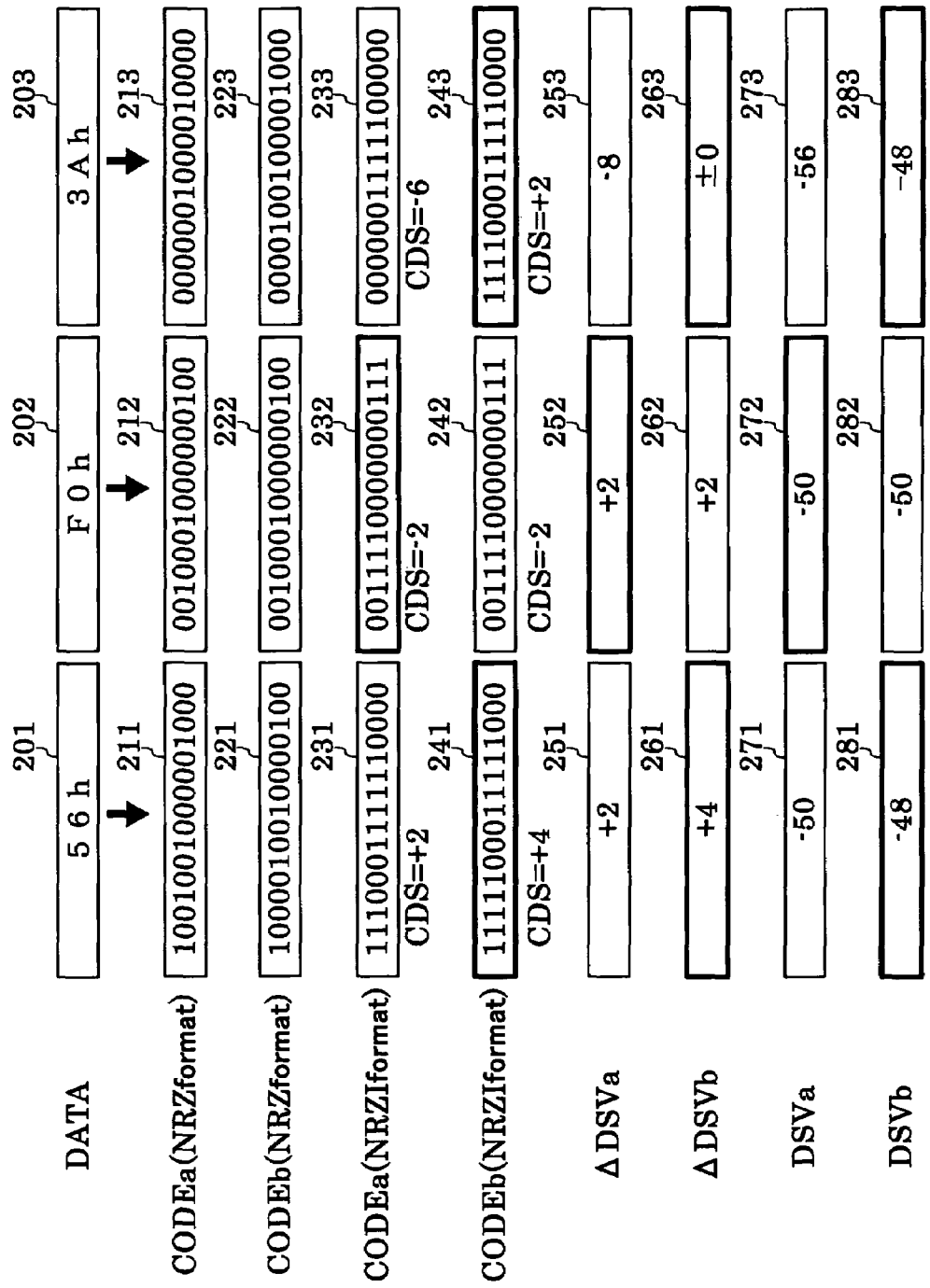
FIG. 8 is a diagram illustrating a specific example of the digital modulation process of the second embodiment of the present invention.

Next, the digital modulation process of the second embodiment will be described with reference to a specific example illustrated in FIG. 8. FIG. 8 indicates a process of outputting modulated codes with respect to source data 201, 202, and 203 successively input, as in FIG. 4. Note that the source code of FIG. 8 is similar to that of FIG. 4. As in the first embodiment, it is assumed that the calculation range of ΔDSV corresponds to the nearest two modulated codes, and a predetermined threshold for determining the size of ΔDSV is "5".

Initially, the source data 201 is input, and the CDSs of the modulated code 231 (CODEa) and the modulated code 241 (CODEb) are calculated to be "+2" and "+4", respectively. Also, a DSV 271 (DSVa) and a DSV 281 (DSVb) are calculated to be "−50" and "−48", respectively. Here, although not shown, it is assumed that the CDS and the DSV of source data immediately before the source data 201 are "0" and "−52", respectively. In this case, the change amount 251 (ΔDSVa) and the change amount 261 (ΔDSVb) are calculated to be "+2" and "+4", respectively. Since both the change amounts 251 and 261 have absolute values within the threshold, the sizes of the absolute values of the DSV 271 and the DSV 281 are compared with each other, so that the candidate modulated code 241 corresponding to the smaller DSV 281 is output as a modulated code for the source data 201.

Next, the source data 202 is input. Both the CDSs of the candidate modulated code 232 (CODEa) and the candidate modulated code 242 (CODEb) are calculated to be "−2". Also, both a DSV 272 (DSVa) and a DSV 282 (DSVb) are calculated to be "−50". Here, the immediately preceding CDS is the CDS of the previously selected candidate modulated code 241 and its value is "+4". Therefore, in this case, both a change amount 252 (ΔDSVa) and a change amount 262 (ΔDSVb) are calculated to be "+2". Since both the change amounts 252 and 262 have absolute values within the threshold, the sizes of the absolute values of the DSV 272 and the DSV 282 are compared with each other. In this case, the DSV 272 and the DSV 282 have the same value, and therefore, any of them may be selected. Here, it is assumed that the candidate modulated code CODEa is selected. Therefore, the candidate modulated code 252 is output as a modulated code for the source data 202.

Thereafter, for the source data 203, the CDSs of the candidate modulated code 233 (CODEa) and the candidate modulated code 243 (CODEb) are calculated to be "−6" and "+2", respectively. Also, a DSV 273 (DSVa) and a DSV 283 (DSVb) are calculated to be "−56" and "−48", respectively. Here, the immediately preceding CDS is the CDS of the previously selected candidate modulated code 232, and its value is "−2". Therefore, in this case, a change amount 253 (ΔDSVa) and a change amount 263 (ΔDSVb) are calculated to be "−8" and "0", respectively. Among them, the absolute value of the change amount 253 exceeds the threshold, however, the absolute value of the change amount 263 is smaller than or equal to the threshold. Therefore, the sizes of the absolute values of the DSV 273 and the DSV 283 are compared with each other. The candidate modulated code 243 corresponding to the smaller DSV 283 is output as a modulated code for the source data 203.

As described above, according to the second embodiment, a DC control is performed so that the DSV of given source data is converged to a predetermined value ("0") while suppressing the change amount (ΔDSV) of the DSV with in a predetermined threshold. Thereby, it is possible to cause the DSV to approach a preferable value while suppressing a sudden change in the DSV.

Note, in the foregoing description, the predetermined threshold for determining the size of ΔDSV is assumed to be "5". This is only for illustrative purposes, and the present invention is not limited to this. The predetermined threshold is preferably set, depending on characteristics of a signal reproducing apparatus for demodulating a generated modulated code. Thereby, it is possible to generate a modulated code optimal to each of various signal reproducing apparatuses.

Third Embodiment

Figure 9:
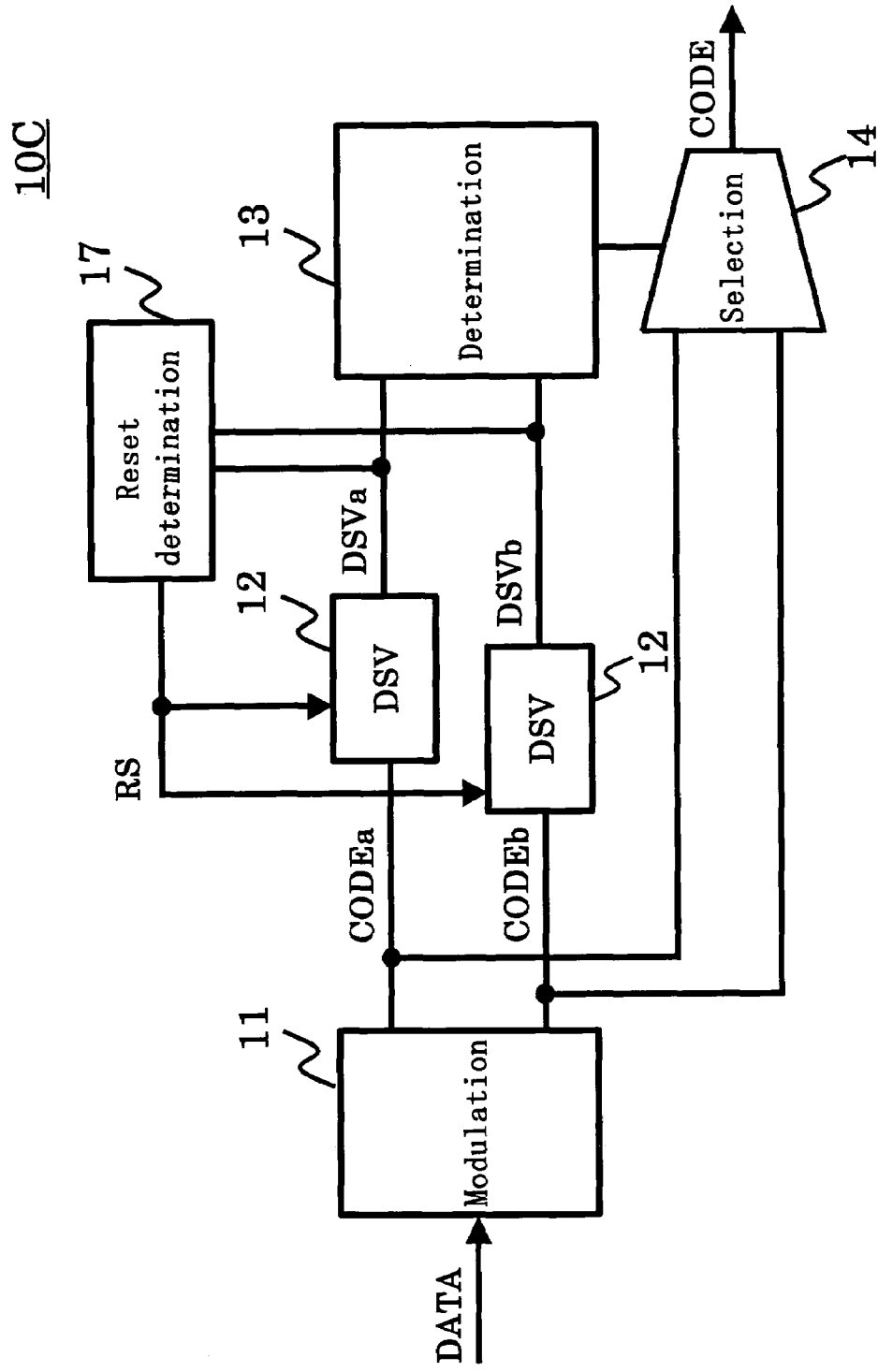
FIG. 9 is a diagram illustrating a structure of a digital modulation apparatus according to a third embodiment of the present invention.

FIG. 9 illustrates a structure of a digital modulation process according to a third embodiment of the present invention. The digital modulation apparatus 10C of the third embodiment comprises a modulated code generator 11, two DSV calculators 12, a modulated code determinator 13, a modulated code selector 14, and a DSV reset determinator 17 as DSV resetting means. The digital modulation apparatus 10C receives source data DATA and outputs an NRZI format modulated code CODE having a limited run length. The parts other than the DSV reset determinator 17 are the same as those described above.

The DSV reset determinator 17 receives a DSVa and a DSVb which are output from the respective DSV calculators 12, and when either of them is larger than or equal to a predetermined threshold, the DSV calculator 12 outputs a reset signal RS. Thereby, the DSVs stored in the DSV calculators 12 are initialized to "0".

Figure 10:
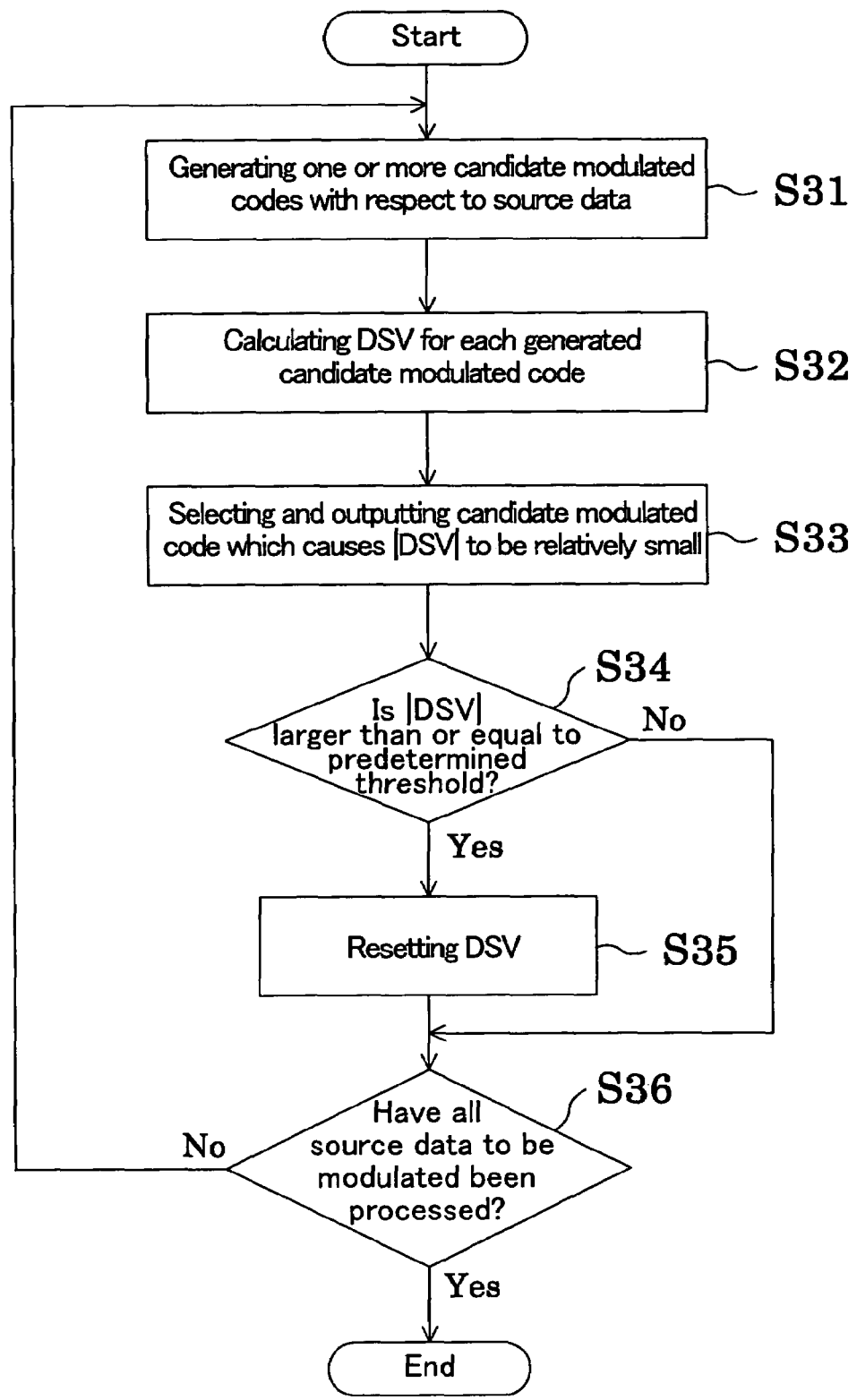
FIG. 10 is a flowchart illustrating a digital modulation process according to the third embodiment of the present invention.

Next, a digital modulation process according to the third embodiment will be described with reference to a flowchart illustrated in FIG. 10.

Initially, when the digital modulation process is started, one or more candidate modulated codes corresponding source data are generated (step S31). Step S31 corresponds to the process performed by the modulated code generator 11.

Thereafter, for each candidate modulated code generated in step S31, the DSV of a modulated code sequence is calculated (step S32). Step S32 corresponding to the process performed by the DSV calculator 12.

Next, the DSVs calculated in step S32 are compared with each other. Among the candidate modulated codes generated in step S31, one which causes the absolute value (or square value) of the DSV to be relatively small is selected and output (step S33). Step S33 corresponds to the process performed by the modulated code determinator 13 and the modulated code selector 14.

Thereafter, it is determined whether or not the absolute value (or square value) of the DSV is larger than or equal to a predetermined threshold (step S34). If a result of the determination is Yes, the DSV is reset (step S35). Steps S34 and S35 correspond to the process performed by the DSV reset determinator 17.

After resetting the DSV in step S35, or when a result of the determination is No in step S34, it is determined whether or not all source data to be modulated have been processed (step S36). When there is still remaining source data to be modulated, the process returns to step S31 and the next source data is processed. On the other hand, when all source data have been processed, the digital modulation process is ended.

Figure 11:
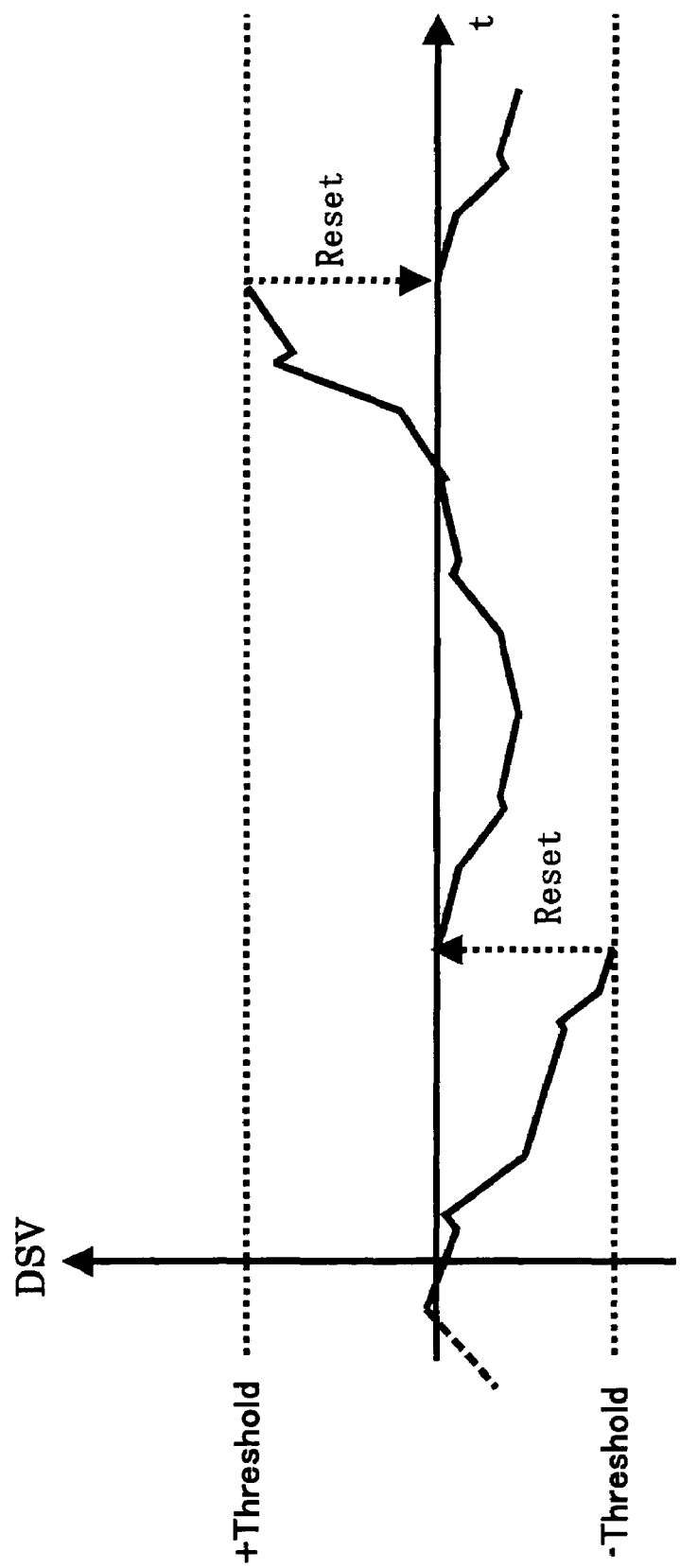
FIG. 11 is a graph illustrating a change in DSV due to the digital modulation process of the third embodiment of the present invention.
Figure 12:
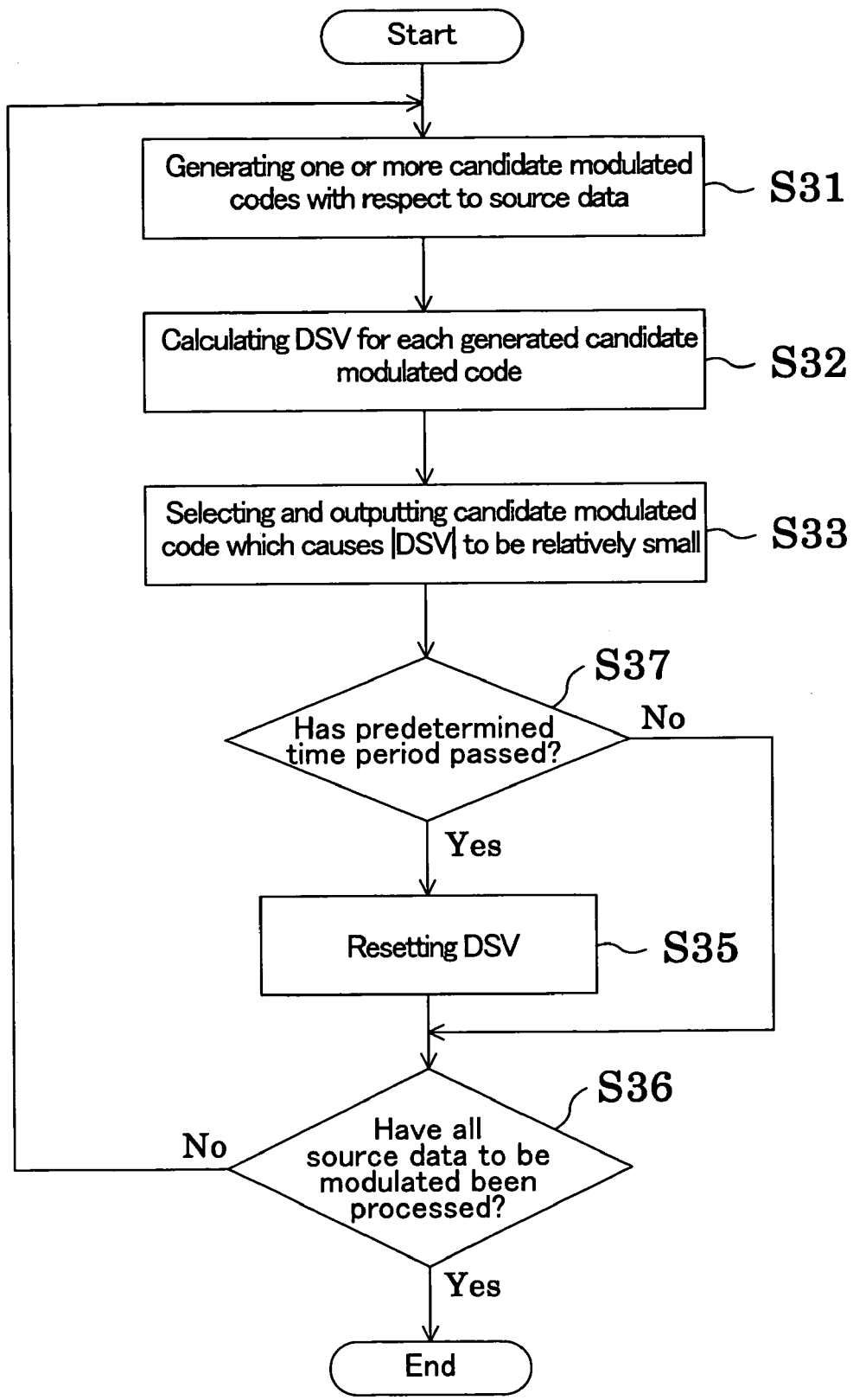
FIG. 12 is a flowchart illustrating another digital modulation process according to the third embodiment of the present invention.

According to the above-described digital modulation process, the DSV varies as illustrated in FIG. 11.

Figure 13:
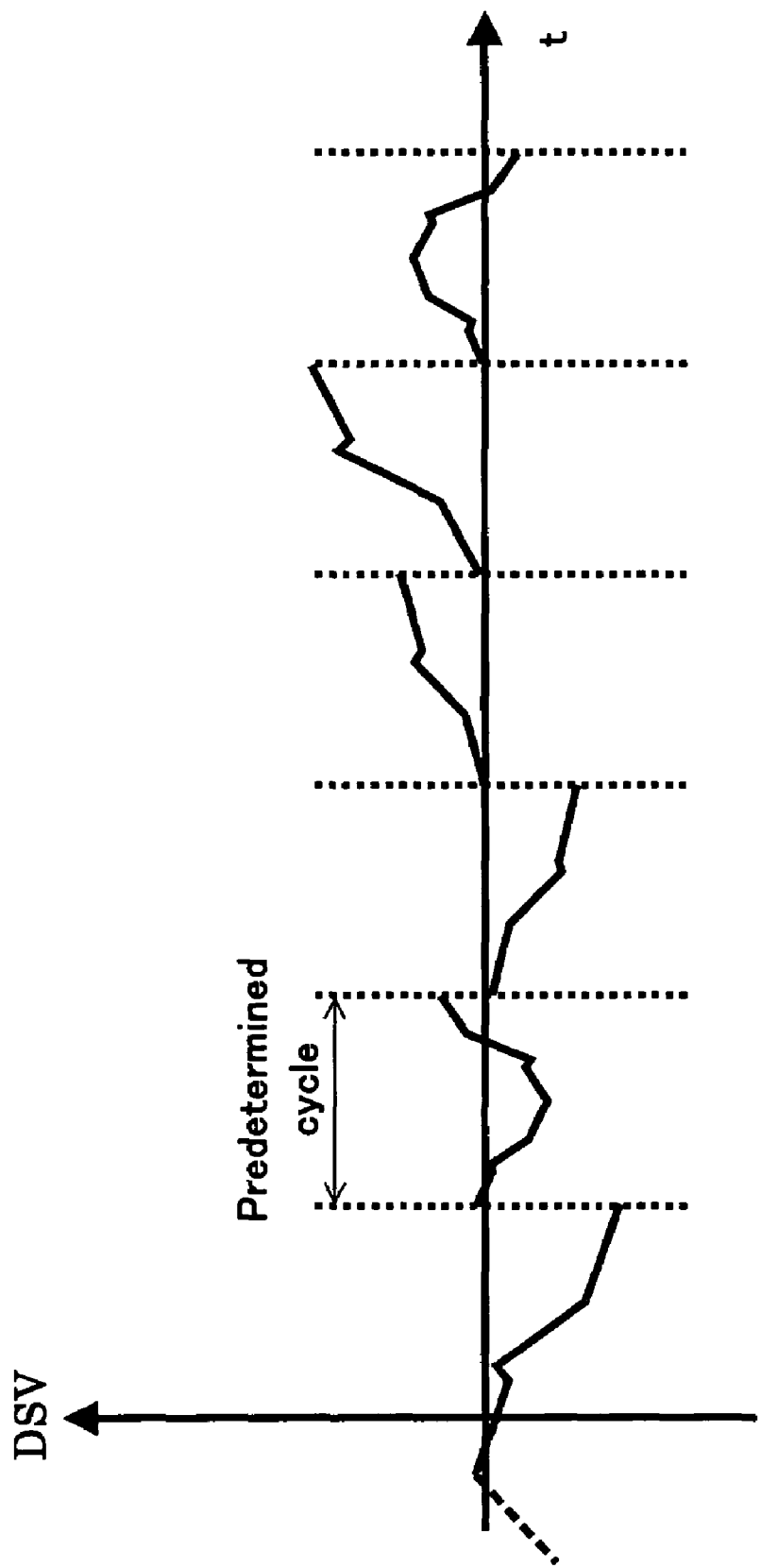
FIG. 13 is a graph illustrating a change in DSV due to another digital modulation process of the third embodiment of the present invention.
Figure 14:
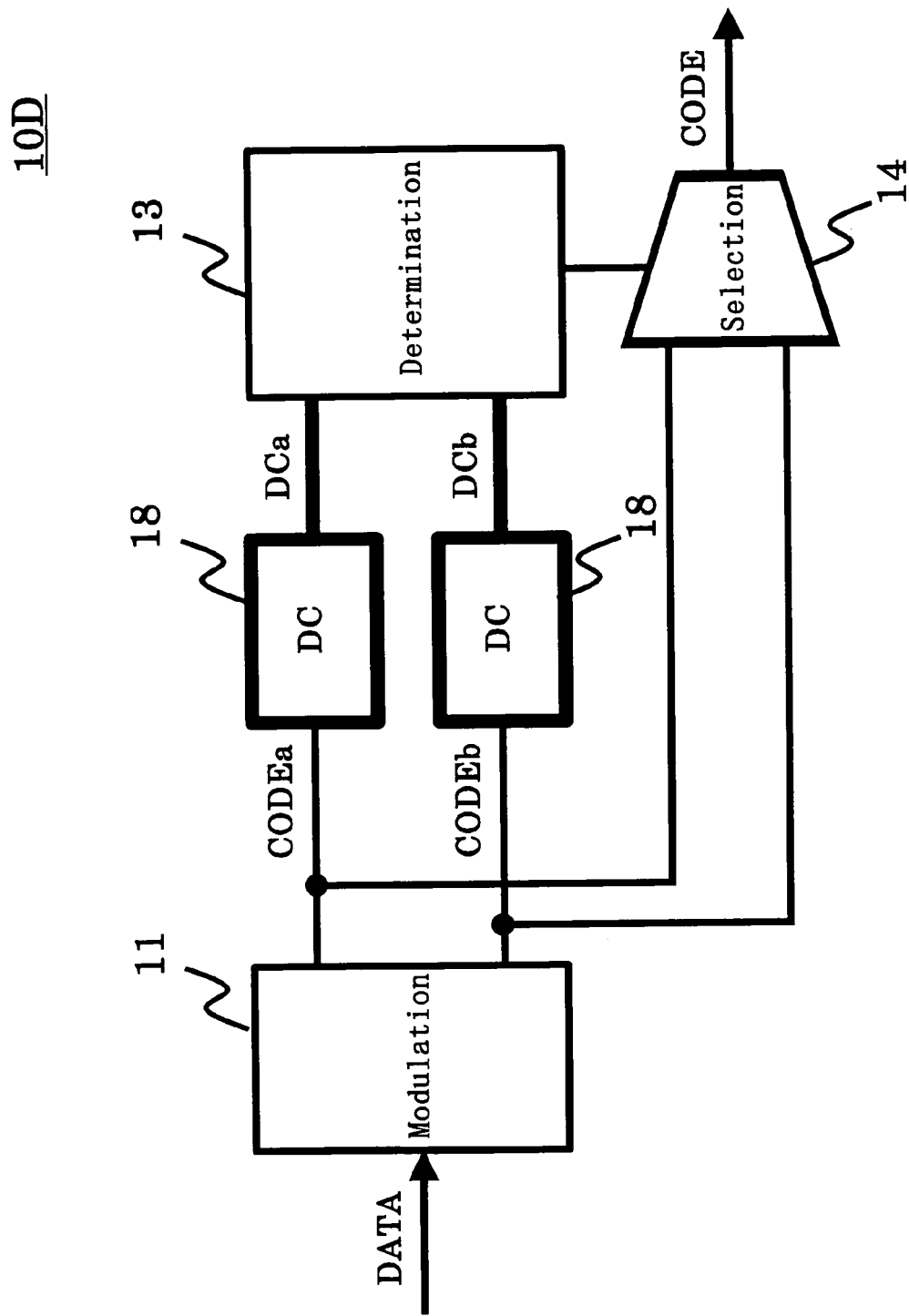
FIG. 14 is a diagram illustrating a structure of a digital modulation apparatus according to a fourth embodiment of the present invention.

On the other hand, the DSV reset determinator 17 can be constructed so that the inputs of DSVa and DSVb are eliminated, the reset signal RS is output in predetermined cycles, and a DSV held in the DSV calculator 12 is initialized to "0". A flow of the digital modulation process thus constructed is illustrated in FIG. 14. The flowchart of FIG. 14 is obtained by replacing the step of determining whether or not the absolute values of all DSVs are larger than or equal to a predetermined threshold in the flowchart of FIG. 10 with the step of determining whether or not a predetermined cycle has passed (step S37). Note that step S37 corresponds to the process performed by the DSV reset determinator 17. According to the digital modulation process, a DSV varies as illustrated in FIG. 13.

As described above, according to the third embodiment, by initializing a DSV with respect to given source data as appropriate, a sudden change in the absolute value of the DSV is suppressed while preventing the DSV from becoming inappropriately large in the digital modulation process. Thereby, jitter is reduced when a generated modulated code (modulated signal) is reproduced, resulting in an improvement in stability.

Note that the stability when a modulated signal is reproduced can be further improved by previously determining a condition for resetting a DSV, i.e., the predetermined threshold or the predetermined cycle, in accordance with characteristics of a signal reproducing apparatus which reproduces the generated modulated signal. For example, the condition for resetting a DSV can be provided, depending on characteristics of the low-pass filter 21 in the signal reproducing apparatus of FIG. 18.

Fourth Embodiment

Figure 17:
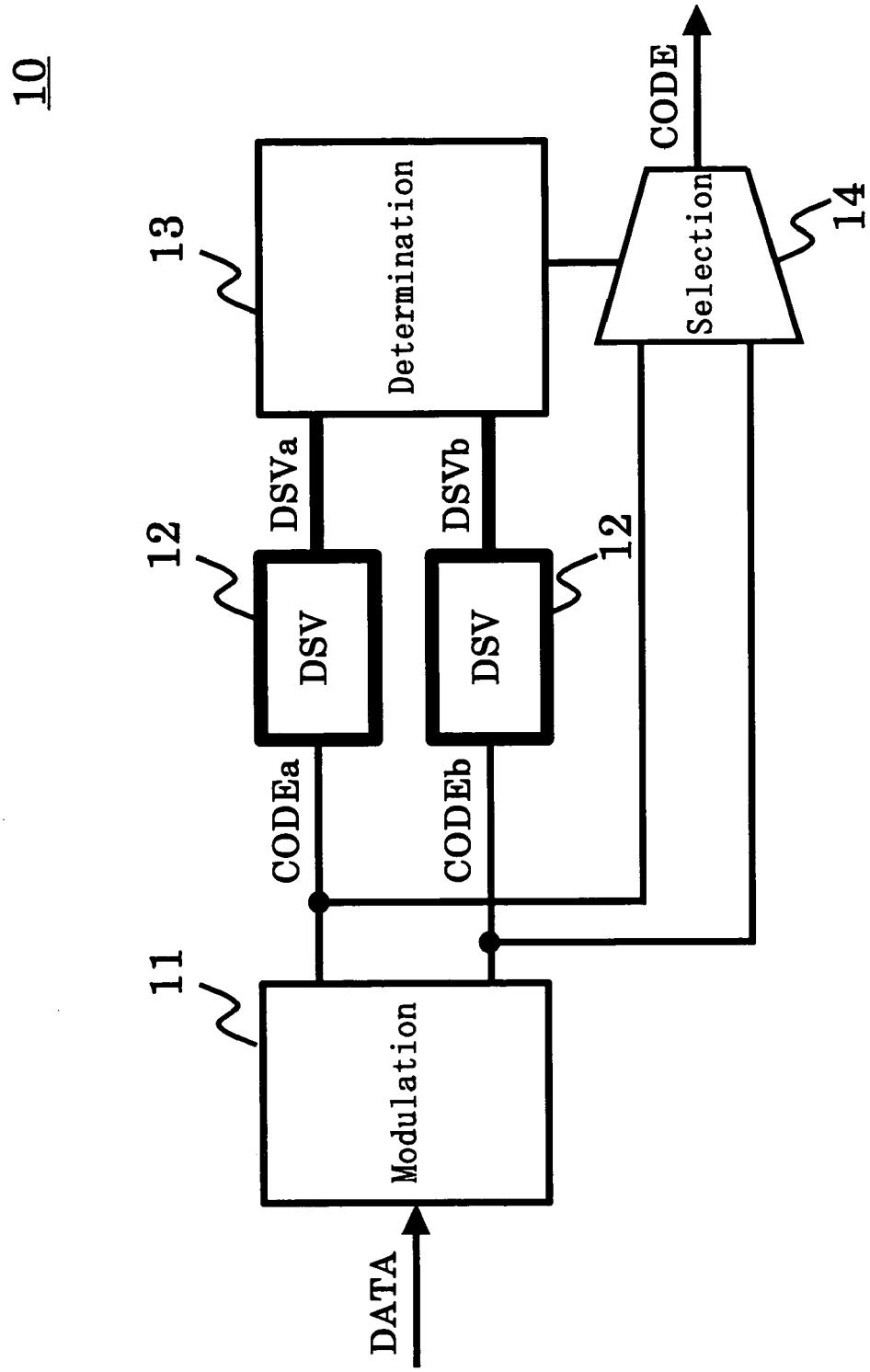
FIG. 17 is a diagram illustrating a structure of a conventional digital modulation apparatus.

FIG. 14 illustrates a structure of a digital modulation apparatus according to a fourth embodiment of the present invention. The digital modulation apparatus 10D of the fourth embodiment comprises a modulated code generator 11, two DSV calculators 12, a modulated code determinator 13, a modulated code selector 14, and a DC component evaluation measure calculator 18. The digital modulation apparatus 10D receives source data DATA and outputs an NRZI format modulated code CODE having a limited run length. The digital modulation apparatus 10D is constructed by replacing the DSV calculator 12 of the conventional digital modulation apparatus of FIG. 17 with the DC component evaluation measure calculator 18. Specifically, the digital modulation apparatus 10D uses an evaluation measure different from a DSV as a measure indicating a DC component contained in a modulated code sequence (hereinafter such an evaluation measure referred to as a "DC component evaluation measure") to select a modulated code CODE which causes the DC component evaluation measure to approach a predetermined value (e.g., "0").

The DC component evaluation measure calculator 18 uses the DC component evaluation measure with respect to the candidate modulated codes CODEa and CODEb generated by the modulated code generator 11 to output DC component values DCa and DCb, respectively. Hereinafter, the DC component evaluation measure will be described in detail with reference to FIG. 15.

Figure 15:
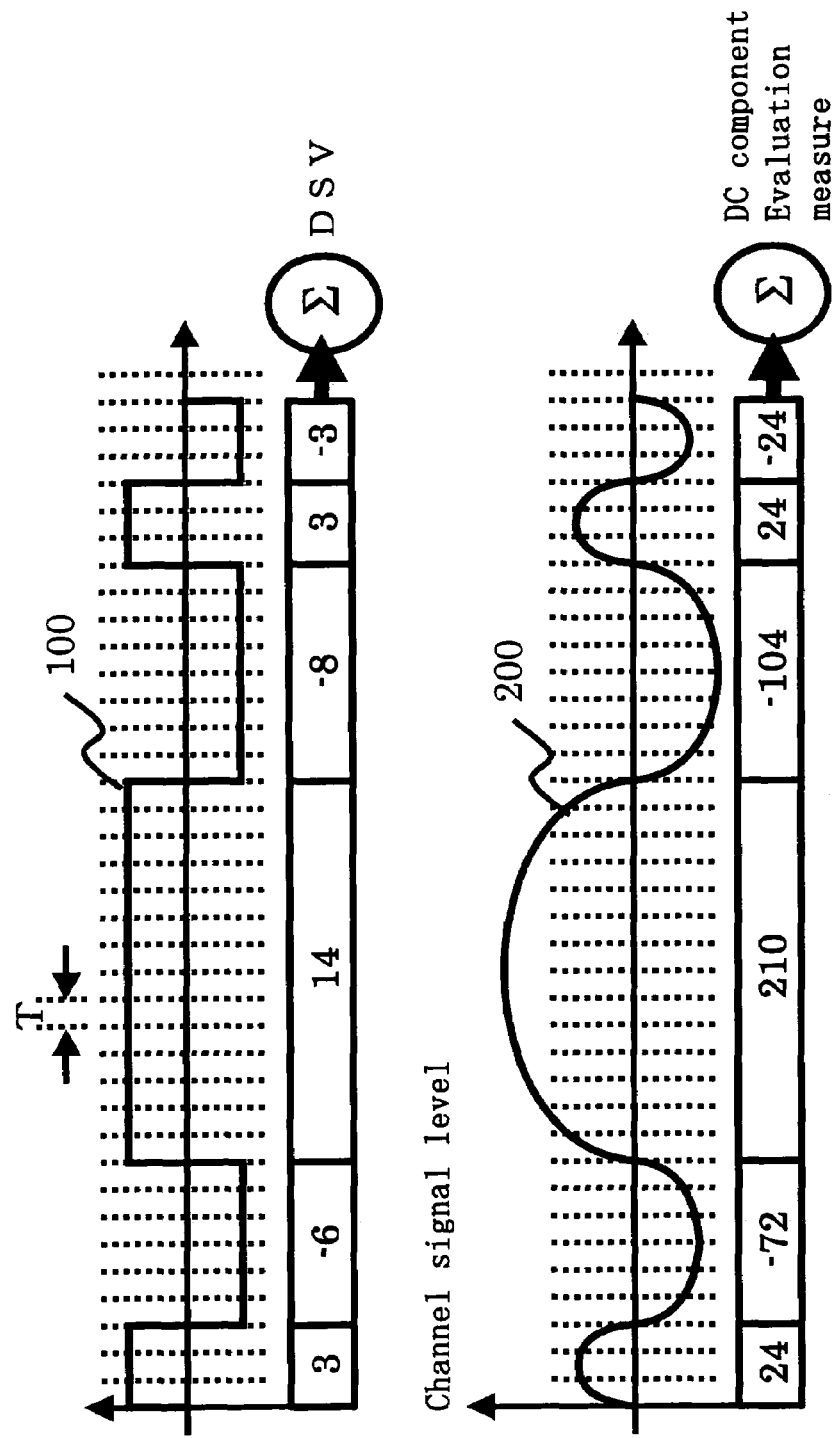
FIG. 15 is a diagram for explaining a DC component evaluation measure according to the present invention.

For calculation of a DSV, a signal modulation model 100 is used. In general, DSV calculation provides a measure for taking a balance between Low intervals and High intervals in a binary modulated signal model. As illustrated in FIG. 15, when there are a High interval of 3T, a Low interval of 6T, a High interval of 14T, . . . , a DSV is calculated by accumulating "a High time period (T number)–a Low time period (T number)", i.e., "+3–6+14+ . . . ". Note that, typically, "a High time period–a Low time period" is divided into modulated code units (so-called CDS), and these are accumulated over a plurality of modulated codes, thereby calculating the DSV.

The DSV is very important as a simple control measure for causing the DC component of a modulated signal to approach "0". However, actual modulated signals have an analog waveform, such as a modulated signal model 200. Therefore, the DSV does not correctly represent the DC component of a modulated signal. Therefore, the "DC component evaluation measure" is herein introduced as a measure for more correctly representing the DC component of a modulated signal.

As illustrated in relation to the modulated signal model 200, the DC component evaluation measure is obtained by accumulating analog signal levels during High intervals and Low intervals. Specifically, a value obtained by performing a predetermined calculation, depending on analog signal amplitudes corresponding to pulse widths of NRZI format modulated codes, such as a width of 3T, a width of 4T, . . . , (e.g., an accumulated value of intervals corresponding to run lengths) is prepared. In the example of FIG. 15, "3T→24", "6T→72", "14T→210", . . . are assigned corresponding to "High of 3T", "Low of 6T", "High of 14T", respectively. Thus, a greater weight is assigned to a signal having a larger run length. These values are added for High intervals and subtracted for Low intervals. Specifically, by calculating "24–72+210– . . . ", it is possible to obtain a DC component evaluation measure which is a more correct evaluation measure for a DC component than DSV. Alternatively, the DC component evaluation measure may be divided and calculated in units of a modulated code, and these divisions may be accumulated over a plurality of modulated codes.

Figure 16:
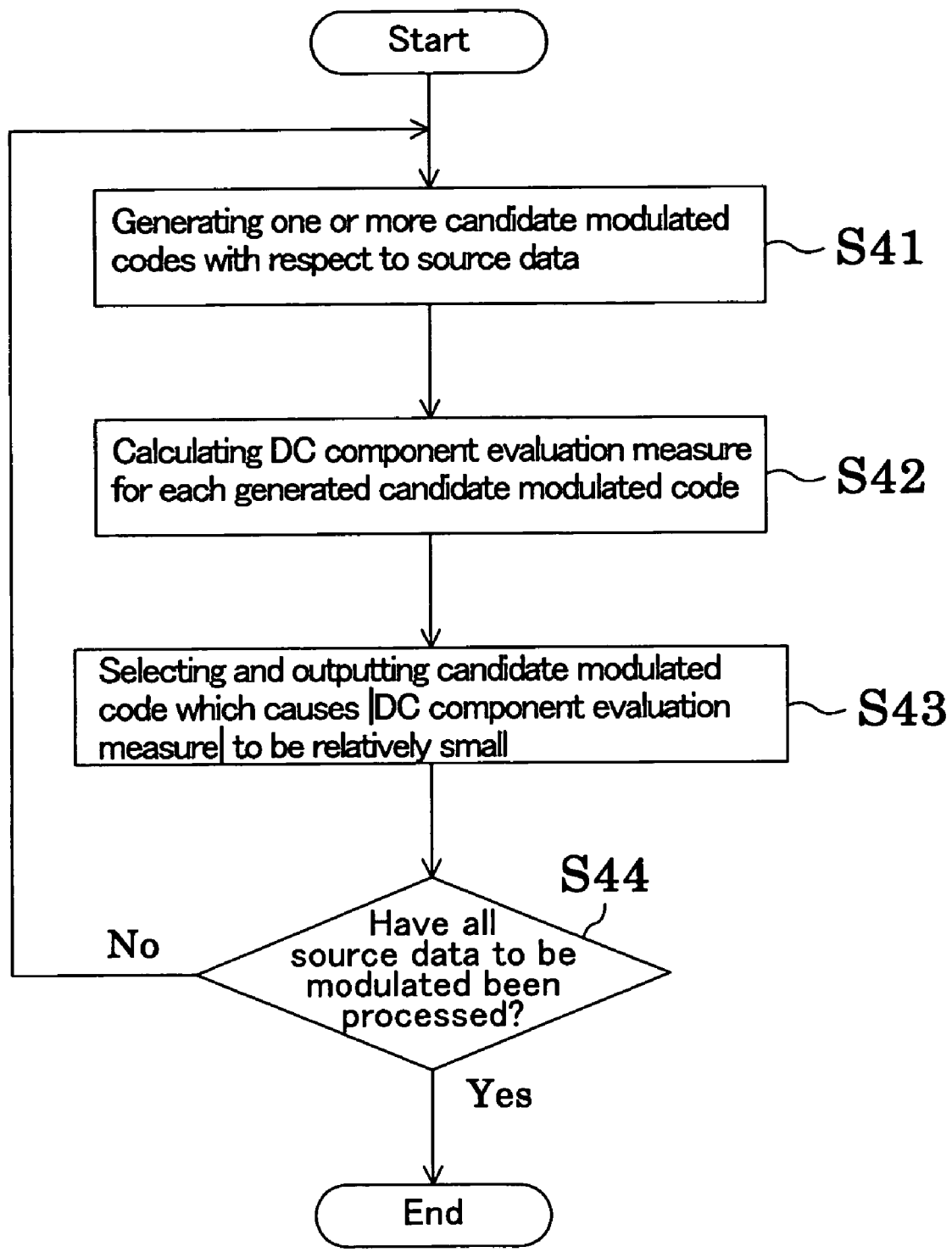
FIG. 16 is a flowchart illustrating a digital modulation process according to the fourth embodiment of the present invention.

Next, a digital modulation process according to the fourth embodiment of the present invention will be described with respect to a flowchart illustrated in FIG. 16.

Initially, when the digital modulation process is started, one or more candidate modulated codes corresponding to source data are generated (step S41). Step S11 corresponds to the process performed by the modulated code generator 11.

Next, for each candidate modulated code calculated in step S41, the DC component evaluation measure of a modulated code sequence is calculated (step S42). Step S42 corresponds to the process performed by the DC component evaluation measure calculator 18.

Thereafter, the DC component evaluation measures calculated in step S42 are compared with each other to select and output one of the candidate modulated codes generated in step S41 which causes the absolute value (or square value) of the DC component evaluation measure to be relatively small (step S43). Step S43 corresponds to the process performed by the modulated code determinator 13 and the modulated code selector 14.

Thereafter, it is determined whether or not all source data to be modulated have been processed (step S44). When there is still remaining source data to be modulated, the process returns to step S41 and the next source data is processed. On the other hand, when it is determined that all source data have been processed, the digital modulation process is ended.

As described above, according to the fourth embodiment, by using a DC component evaluation measure which is more approximate to the waveform of an actual modulated signal than DSV, a more accurate DC control can be performed. Thereby, stability when reproducing a modulated signal can be further improved.

Note that DC component evaluation measures may be weighted by referencing a previously prepared table or may be calculated using a function taking a run length as a parameter.

Also in each of the above-described embodiments, the modulated code generator 11 generates two different candidate modulated codes. The present invention is not limited to this. The modulated code generator 11 may generate three or more different candidate modulated codes. In this case, the number of DSV calculators 12 and the number of DSV change amount calculators 15 are increased, depending on the number of candidate modulated codes.

Also in each of the above-described embodiments, the modulated code generator 11, the DSV calculator 12, the modulated code determinator 13, the modulated code selector 14, the DSV change amount calculator 15, the modulated code determinator 16. The reset determinator 17 and the DC component evaluation measure calculator 18 can be implemented in hardware or software. A portion of or all functions of the digital modulation apparatus can be processed by software.

INDUSTRIAL APPLICABILITY

As described above, the present invention can be applied to an information recording apparatus of converting source data to a modulated code having a limited run length and writing the resultant data onto a recording medium, a communication apparatus (particularly, a transmission apparatus) using the modulated code to be transmitted through a transmission channel, and the like.

The invention claimed is:
1. A digital modulation apparatus for converting input source data to an NRZI format modulated code having a limited run length, comprising:
   modulated code generating means of generating a plurality of candidate modulated codes with respect to the source data, the plurality of candidate modulated codes being candidates for the modulated code;

DSV change calculating means of calculating a degree of a change in a DSV of a modulated code sequence when each of the plurality of candidate modulated codes generated by the code generating means is selected as the modulated code;

modulated code determining means of comparing the degrees of changes in the DSVs calculated by the DSV change calculating means with each other, and determining that one of the plurality of candidate modulated codes generated by the modulated code generating means, the one causing the degree of a change in the DSV to be relatively small, should be used as the modulated code; and modulated code selecting means of selecting one of the plurality of candidate modulated codes generated by the code generating means, the one corresponding to a result of determination by the code determining means, and outputting the selected candidate modulated code as the modulated code.

2. The apparatus of claim 1, wherein the degree of a change in the DSV is calculated within a range corresponding to a code sequence including a predetermined number of nearest candidate modulated codes generated by the modulated code generating means, and the predetermined number is determined, depending on characteristics of a signal reproducing apparatus for reproducing the modulated code.

3. The apparatus of claim 1, wherein the degree of a change in the DSV is calculated within a range corresponding to a code sequence including a predetermined number of nearest candidate modulated codes generated by the modulated code generating means, and the predetermined number is determined, depending on characteristics of a low-pass filter circuit for determining a binary slice level in a signal reproducing apparatus for reproducing the modulated code.

4. The apparatus of claim 1, wherein the DSV change calculating means includes:

CDS holding means of holding a CDS corresponding to a DSV of each code in a code sequence including a predetermined number of candidate modulated codes generated by the modulated code generating means; and CDS accumulating means of accumulating the CDS of each code in the code sequence and holding the accumulated value, wherein the DSV change calculating means outputs the CDS accumulated value held in the CDS accumulating means as the degree of a change in the DSV.

5. The apparatus of claim 4, wherein the CDS holding means, when a code is input to the DSV change calculating means, holds a first CDS of the input code and outputs a second CDS of an oldest code of the held CDSs, and the CDS accumulating means adds the first CDS to and subtracts the second CDS from the CDS accumulated value held therein and holds the resultant value as a new CDS accumulated value.

6. The apparatus of claim 5, wherein the CDS holding means is a shift register.

7. The apparatus of claim 1, comprising:

DSV calculating means of calculating a DSV of a modulated code sequence when each of the plurality of candidate modulated codes generated by the modulated code generating means is selected as the modulated code, wherein the modulated code determining means, when all the degrees of changes in the DSVs exceed a predetermined threshold, performs the determination, and when at least one of the degrees of changes in the DSVs is smaller than or equal to the predetermined threshold, compares DSVs whose degree of a change is smaller than or equal to the predetermined threshold, among the DSVs calculated by the DSV calculating means, with each other, to determine that one of the plurality of candidate modulated codes generated by the modulated code generating means, the DSV of the one being closer to a predetermined value.

8. A digital modulation apparatus for converting input source data to an NRZI format modulated code having a limited run length, comprising:

modulated code generating means of generating a plurality of candidate modulated codes with respect to the source data, the plurality of candidate modulated codes being candidates for the modulated code;

DSV calculating means of calculating a DSV of a modulated code sequence when each of the plurality of candidate modulated codes generated by the modulated code generating means is selected as the modulated code;

DSV resetting means of initializing the DSV calculated by the DSV calculating means;

modulated code determining means of comparing the DSVs calculated by the DSV calculating means with each other, and determining that one of the plurality of candidate modulated codes generated by the modulated code generating means, the one causing the DSV to be relatively small, should be used as the modulated code; and modulated code selecting means of selecting one of the plurality of candidate modulated codes generated by the modulated code generating means, the one corresponding to a result of determination by the code determining means, and outputting the selected candidate modulated code as the modulated code, wherein the DSV resetting means performs the initialization when any of the DSVs calculated by the DSV calculating means is larger than or equal to a predetermined threshold.

9. The apparatus of claim 8, wherein the predetermined threshold is determined, depending on characteristics of a signal reproducing apparatus for reproducing the modulated code.

10. The apparatus of claim 8, wherein the predetermined threshold is determined, depending on characteristics of a low-pass filter for determining a binary slice level in a signal reproducing apparatus for reproducing the modulated code.

11. A digital modulation apparatus for converting input source data to an NRZI format modulated code having a limited run length, comprising:

modulated code generating means of generating a plurality of candidate modulated codes with respect to the source data, the plurality of candidate modulated codes being candidates for the modulated code;

DSV calculating means of calculating a DSV of a modulated code seciuence when each of the plurality of candidate modulated codes generated by the modulated code generating means is selected as the modulated code;

DSV resetting means of initializing the DSV calculated by the DSV calculating means;

modulated code determining means of comparing the DSVs calculated by the DSV calculating means with each other, and determining that one of the plurality of candidate modulated codes generated by the modulated code generating means, the one causing the DSV to be relatively small, should be used as the modulated code; and modulated code selecting means of selecting one of the plurality of candidate modulated codes generated by the modulated code generating means, the one corresponding to a result of determination by the code determining means, and outputting the selected candidate modulated code as the modulated code, wherein the DSV resetting means performs the initialization in predetermined cycles, and the predetermined cycle is determined, depending on characteristics of a signal reproducing apparatus for reproducing the modulated code.

12. The apparatus of claim 11, wherein
the predetermined cycle is determined, depending on characteristics of a low-pass filter for determining a binary slice level in a signal reproducing apparatus for reproducing the modulated code.

13. A digital modulation apparatus for converting input source data to an NRZI format modulated code having a limited run length, wherein
a value corresponding to a logic level of each bit in a sequence of the modulated code is weighted, depending on a run length, and is accumulated, the resultant value is used as a measure indicating a DC component included in the sequence of the modulated code, and the modulated code is selected so that the measure approaches a predetermined value.

14. The apparatus of claim 13, wherein
the weighting depending on the run length is performed so that, when a first run length is larger than a second run length, a weight corresponding to the first run length is larger than or equal to a weight corresponding to the second run length.

15. The apparatus of claim 14, wherein
the weights corresponding to the first and second run lengths are determined based on accumulated values corresponding to the first and second run lengths in an analog signal waveform corresponding to the sequence of the modulated code.

16. A digital modulation method for converting input source data to an NRZI format modulated code having a limited run length, comprising:
a modulated code generating step of generating a plurality of candidate modulated codes with respect to the source data, the plurality of candidate modulated codes being candidates for the modulated code;
a DSV change calculating step of calculating a degree of a change in a DSV of a modulated code sequence when each of the plurality of candidate modulated codes generated by the code generating step is selected as the modulated code; and
a modulated code outputting step of comparing the degrees of changes in the DSVs calculated by the DSV change calculating step with each other, and outputting, as the modulated code, one of the plurality of candidate modulated codes generated by the modulated code generating step, the one causing the degree of a change in the DSV to be relatively small.

17. The method of claim 16, comprising:
a DSV calculating step of calculating a DSV of a modulated code sequence when each of the plurality of candidate modulated codes generated by the modulated code generating step is selected as the modulated code,
wherein the modulated code outputting step, when all the degrees of changes in the DSVs exceed a predetermined threshold, performs the outputting, and when at least one of the degrees of changes in the DSVs is smaller than or equal to the predetermined threshold, compares DSVs whose degree of a change is smaller than or equal to the predetermined threshold, among the DSVs calculated by the DSV calculating step, with each other, to determine that one of the plurality of candidate modulated codes generated by the modulated code generating step, the DSV of the one being closer to a predetermined value.

18. A digital modulation method for converting input source data to an NRZI format modulated code having a limited run length, wherein
a value corresponding to a logic level of each bit in a sequence of the modulated code is weighted, depending on a run length, and is accumulated, the resultant value is used as a measure indicating a DC component included in the sequence of the modulated code, and the modulated code is selected so that the measure approaches a predetermined value.

19. A digital modulation method for converting input source data to an NRZI format modulated code having a limited run length, comprising:
a modulated code generating step of generating a plurality of candidate modulated codes with respect to the source data, the plurality of candidate modulated codes being candidates for the modulated code;
a DSV calculating step of calculating a DSV of a modulated code sequence when each of the plurality of candidate modulated codes generated by the code generating step is selected as the modulated code;
a DSV resetting step of initializing the DSV calculated by the DSV calculating step;
a modulated code determining step of comparing the DSVs calculated by the DSV calculating means with each other, and determining that one of the plurality of candidate modulated codes generated by the modulated code generating step, the one causing the DSV to be relatively small, should be used as the modulated code; and
a modulated code selecting step of selecting one of the plurality of candidate modulated codes generated by the code generating step, the one corresponding to a result of determination by the code determining step, and outputting the selected candidate modulated code as the modulated code,
wherein the DSV resetting means performs the initialization when any of the DSVs calculated by the DSV calculating means is larger than or equal to a predetermined threshold.

20. The method of claim 19, wherein
the predetermined threshold is determined, depending on characteristics of a signal reproducing apparatus for reproducing the modulated code.

21. The method of claim 19, wherein
the predetermined threshold is determined, depending on characteristics of a low-pass filter for determining a binary slice level in a signal reproducing apparatus for reproducing the modulated code.

22. A digital modulation method for converting input source data to an NRZI format modulated code having a limited run length, comprising:
- a modulated code generating step of generating a plurality of candidate modulated codes with respect to the source data, the plurality of candidate modulated codes being candidates for the modulated code;
- a DSV calculating step of calculating a DSV of a modulated code sequence when each of the plurality of candidate modulated codes generated by the code generating step is selected as the modulated code;
- a DSV resetting step of initializing the DSV calculated by the DSV calculating step;
- a modulated code determining step of comparing the DSVs calculated by the DSV calculating means with each other, and determining that one of the plurality of candidate modulated codes generated by the modulated code generating step, the one causing the DSV to be relatively small, should be used as the modulated code; and
- a modulated code selecting step of selecting one of the plurality of candidate modulated codes generated by the code generating step, the one corresponding to a result of determination by the code determining step, and outputting the selected candidate modulated code as the modulated code, wherein the DSV resetting step performs the initialization in predetermined cycles, and the predetermined cycle is determined, depending on characteristics of a signal reproducing apparatus for reproducing the modulated code.

23. The method of claim 22, wherein the predetermined cycle is determined, depending on characteristics of a low-pass filter for determining a binary slice level in a signal reproducing apparatus for reproducing the modulated code.

* * * * *